United States Patent
Wendt et al.

(10) Patent No.: US 7,996,964 B2
(45) Date of Patent: Aug. 16, 2011

(54) BUCKLE DEVICE

(75) Inventors: Mario Wendt, Stahnsdorf (DE);
Kliment Vidolov, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 159 days.

(21) Appl. No.: 12/458,994

(22) Filed: Jul. 29, 2009

(65) Prior Publication Data
US 2009/0288275 A1 Nov. 26, 2009

Related U.S. Application Data

(63) Continuation of application No. PCT/EP2008/051691, filed on Feb. 12, 2008.

(30) Foreign Application Priority Data

Feb. 12, 2007 (DE) .................. 10 2007 007 702
Sep. 28, 2007 (DE) .................. 10 2007 047 549

(51) Int. Cl.
*A44B 11/04* (2006.01)
(52) U.S. Cl. .................. 24/593.1; 24/DIG. 51; 297/471
(58) Field of Classification Search .................. None
See application file for complete search history.

(56) References Cited

U.S. PATENT DOCUMENTS

| | | | |
|---|---|---|---|
| 2,796,953 A * | 6/1957 | Becker | 188/371 |
| 3,888,541 A | 6/1975 | Stephenson | |
| 3,898,715 A | 8/1975 | Balder | |
| 3,973,650 A | 8/1976 | Nagazumi | |
| 4,027,905 A | 6/1977 | Shimogawa et al. | |
| 4,291,918 A | 9/1981 | Finn et al. | |
| 4,876,770 A | 10/1989 | Bougher | |
| 5,058,244 A | 10/1991 | Fernandez | |
| 5,138,749 A | 8/1992 | McCune et al. | |
| 5,411,292 A | 5/1995 | Collins et al. | |
| 5,667,246 A | 9/1997 | Miller, III | |
| 5,806,148 A | 9/1998 | McFalls et al. | |
| 5,870,816 A | 2/1999 | McFalls et al. | |
| 6,708,380 B2 | 3/2004 | Schneider et al. | |
| 7,325,280 B2 | 2/2008 | Ichida | |
| 7,712,194 B2 | 5/2010 | Fyhr | |
| 2002/0067035 A1 | 6/2002 | Ritters et al. | |
| 2009/0025193 A1 | 1/2009 | Fyhr | |

FOREIGN PATENT DOCUMENTS

| | | |
|---|---|---|
| DE | 23 01 506 A1 | 8/1973 |
| DE | 24 60 163 A1 | 6/1976 |
| DE | 27 41 297 A1 | 3/1979 |
| DE | 31 16 910 A1 | 11/1982 |

(Continued)

OTHER PUBLICATIONS

U.S. Appl. No. 12/458,985, filed Jul. 29, 2009, Wendt et al.

(Continued)

*Primary Examiner* — Jack W. Lavinder
(74) *Attorney, Agent, or Firm* — Foley & Lardner LLP

(57) ABSTRACT

A buckle device for a motor vehicle is provided. The buckle device comprising a locking tongue for inserting into a buckle and a deflecting body connected to the locking tongue, which is configured to subdivide a safety belt into a shoulder portion and a lap portion and to deflect said safety belt such that the two portions extend away from the deflecting body in different directions. The deflecting body is connected to the locking tongue via at least one elongate element, which is at least partially wound around the deflecting body.

19 Claims, 17 Drawing Sheets

FOREIGN PATENT DOCUMENTS

| | | |
|---|---|---|
| DE | 32 33 797 C1 | 6/1983 |
| DE | 37 15 861 A1 | 12/1988 |
| DE | 38 29 982 A1 | 3/1989 |
| DE | 42 32 160 A1 | 3/1994 |
| DE | 43 07 089 C2 | 11/1995 |
| DE | 198 32 467 A1 | 1/2000 |
| DE | 198 32 467 A1 | 1/2000 |
| DE | 199 15 275 A1 | 10/2000 |
| DE | 203 03 549 UI | 6/2003 |
| DE | 102 10 781 A1 | 10/2003 |
| DE | 10 2004 061 709 A1 | 7/2006 |
| GB | 2 349 615 A | 11/2000 |
| GB | 2 356 604 A | 5/2001 |
| JP | 8-40195 A | 2/1996 |
| JP | 2001-047967 A | 2/2001 |
| JP | 2007-186167 A | 7/2007 |
| JP | 2007-186168 A | 7/2007 |
| KR | 100150310 B1 | 6/1998 |
| KR | 100166178 B1 | 9/1998 |
| WO | WO 2004/076248 A1 | 9/2004 |
| WO | WO 2006/072313 A1 | 7/2006 |
| WO | WO 2006/092206 A1 | 9/2006 |
| WO | WO 2007/090551 A1 | 8/2007 |

OTHER PUBLICATIONS

Chinese Examination report in Appln No. 200880001675.0 dated Jul. 5, 2010.
Russian Decision in Appln No. 2009132637/11.
US Office Action in U.S. Appl. No. 12/458,985 dated Sep. 29, 2010.

* cited by examiner

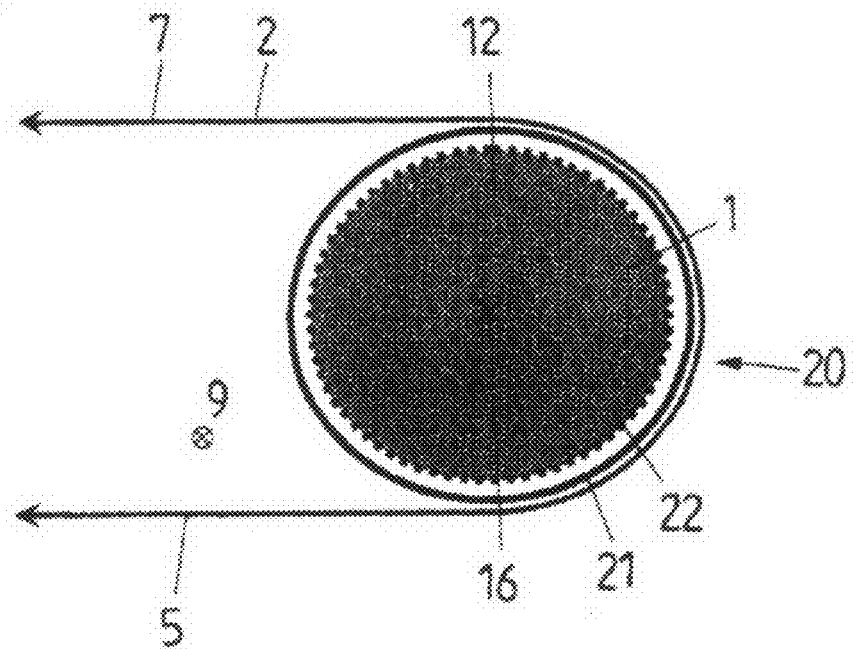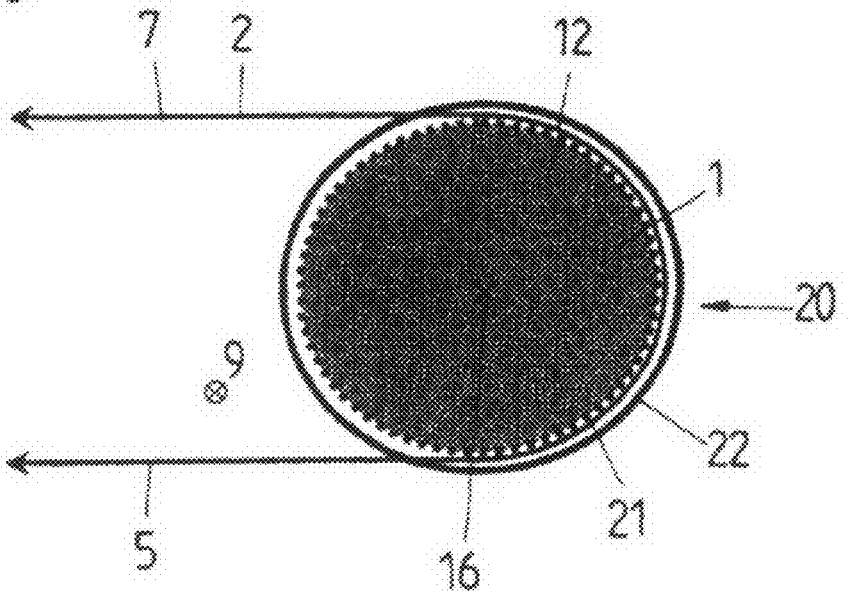

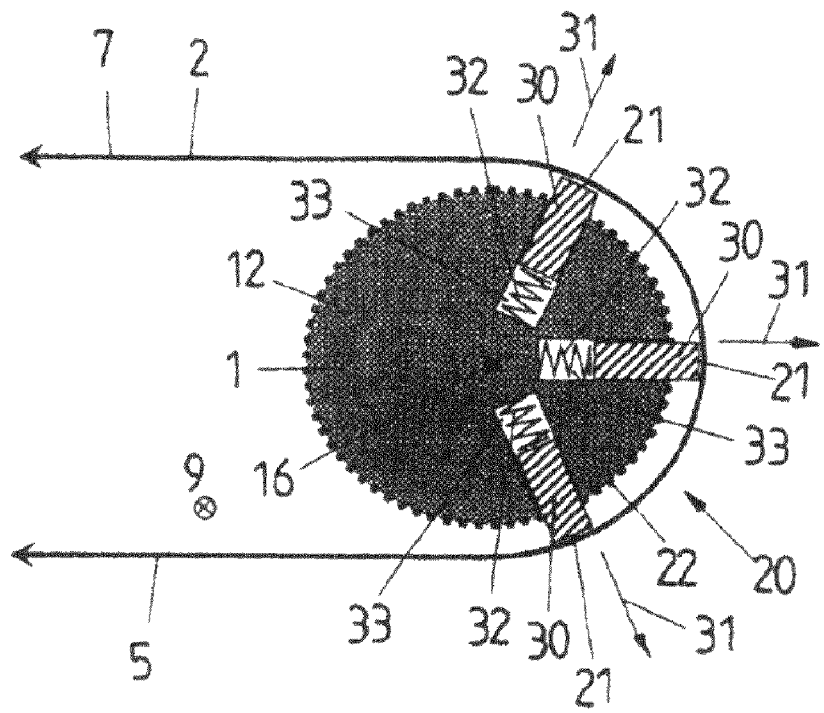
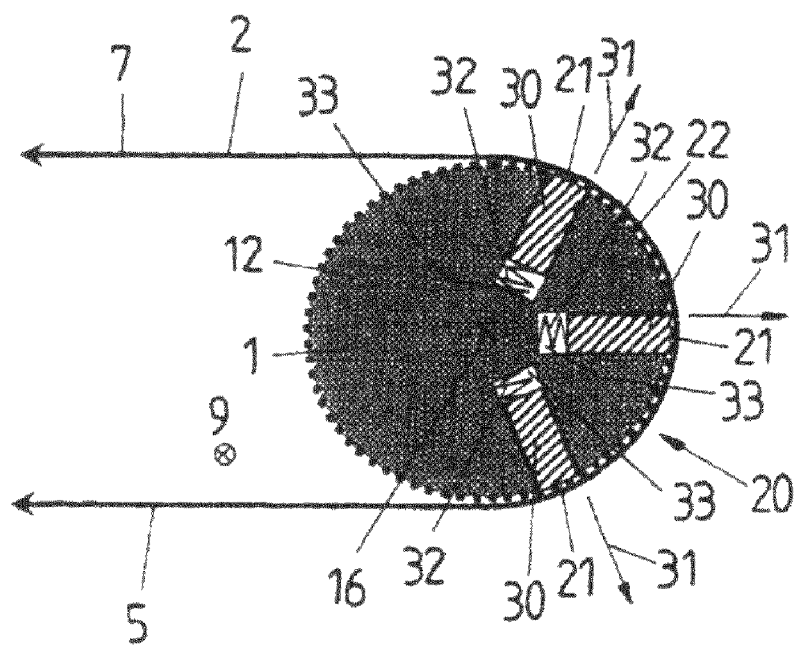

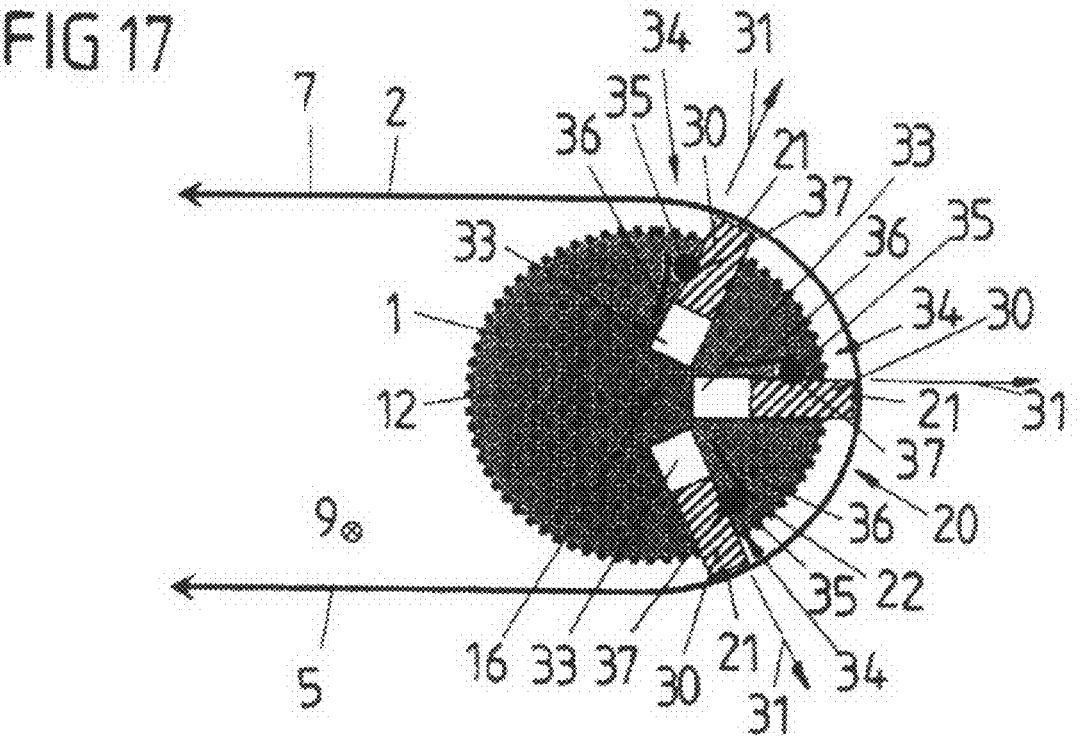
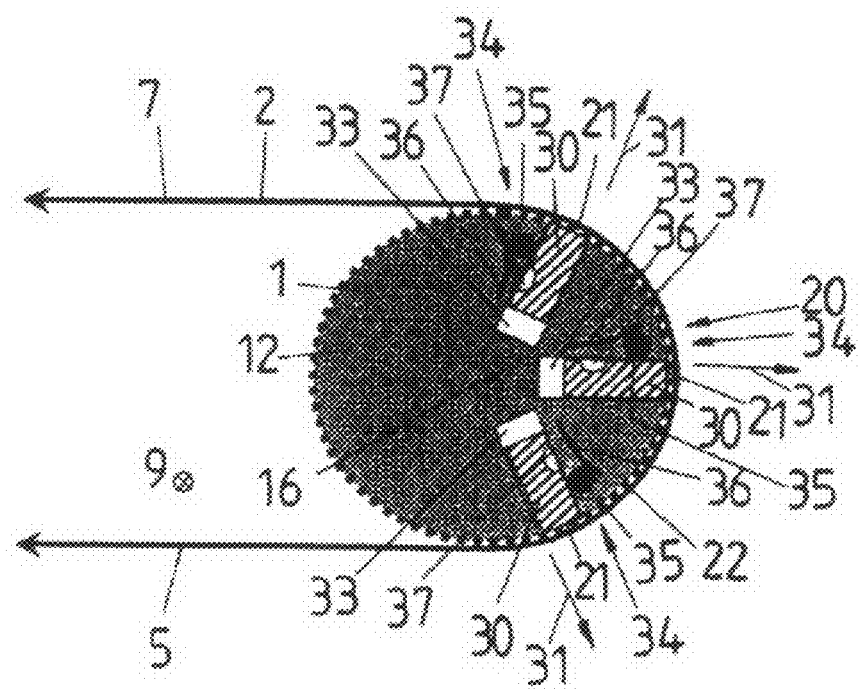

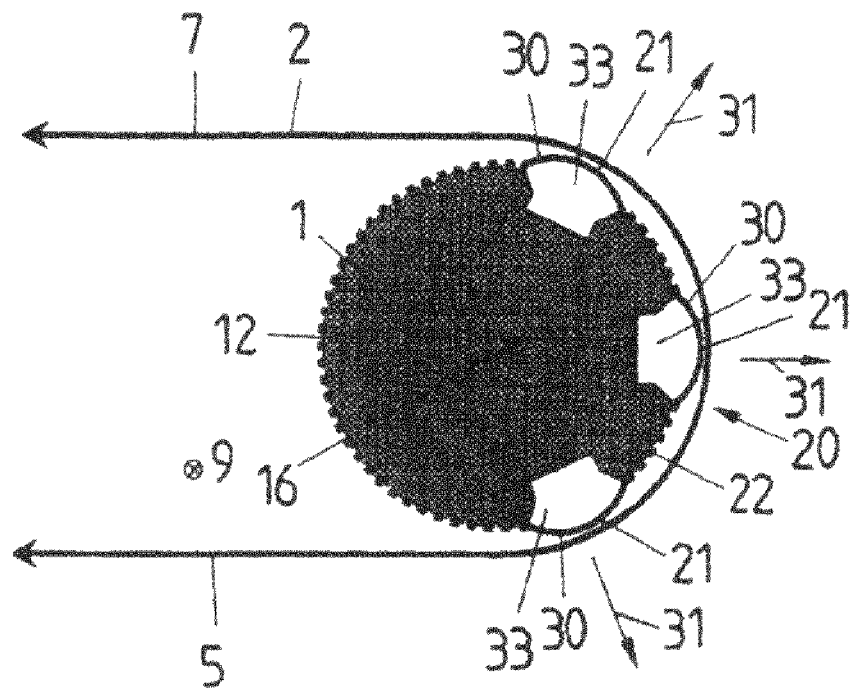
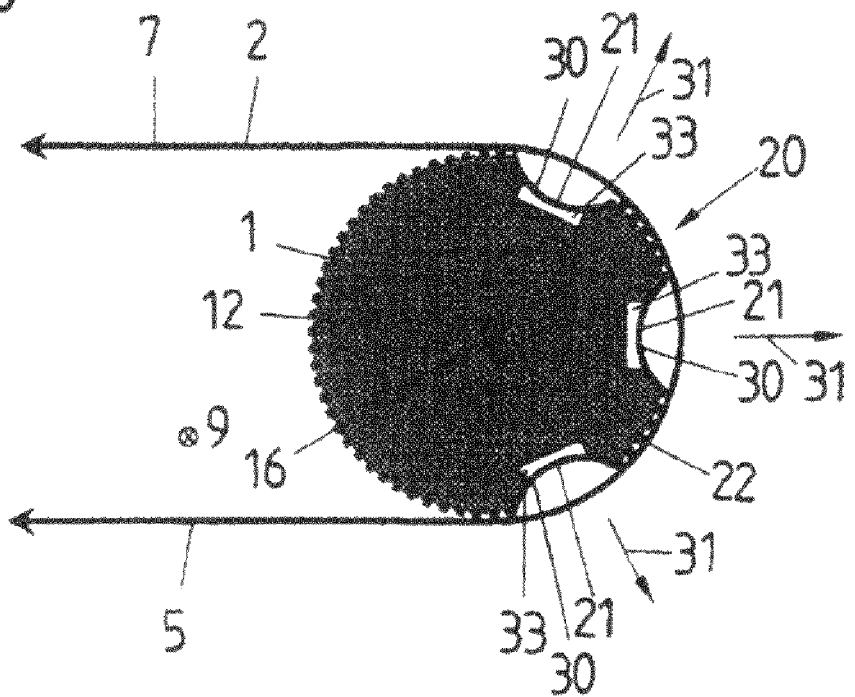

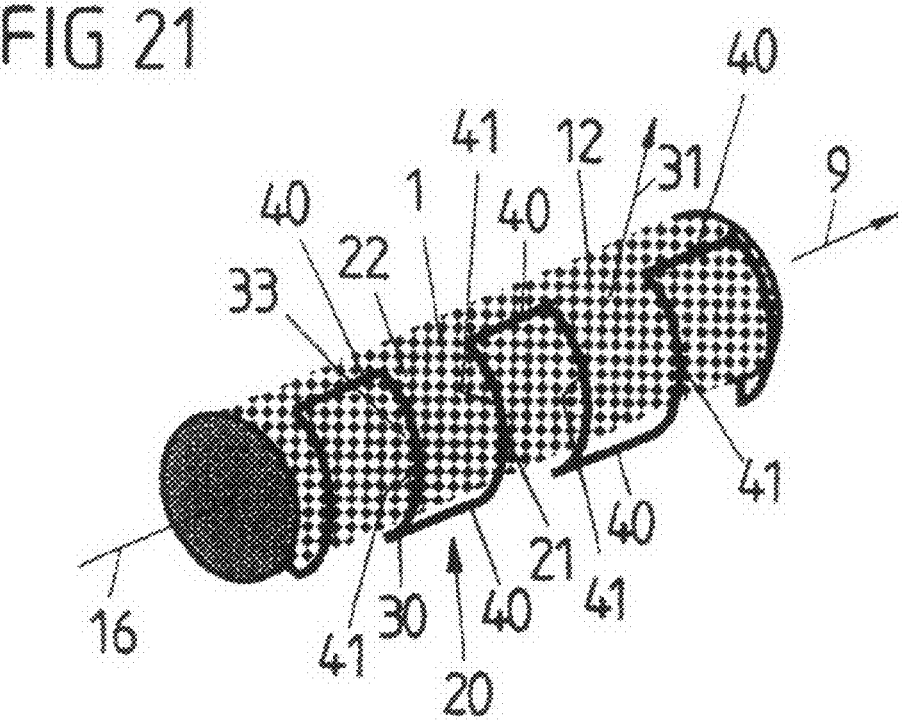
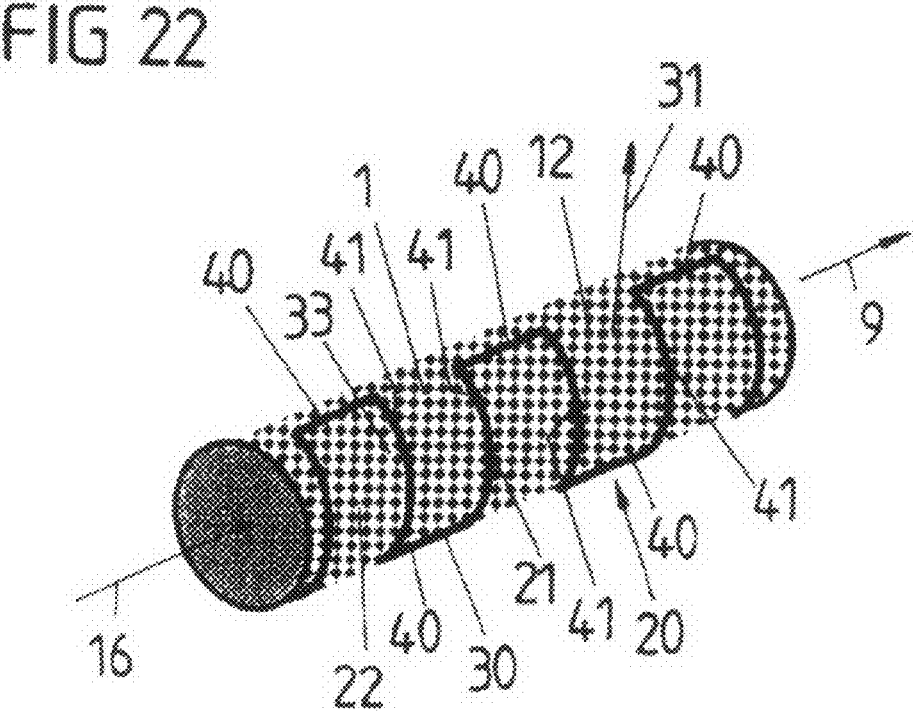

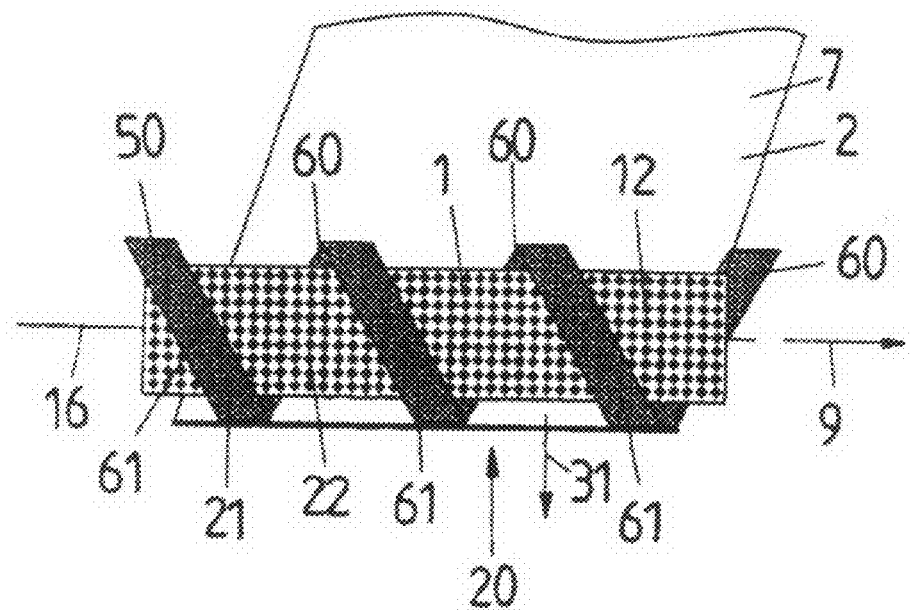
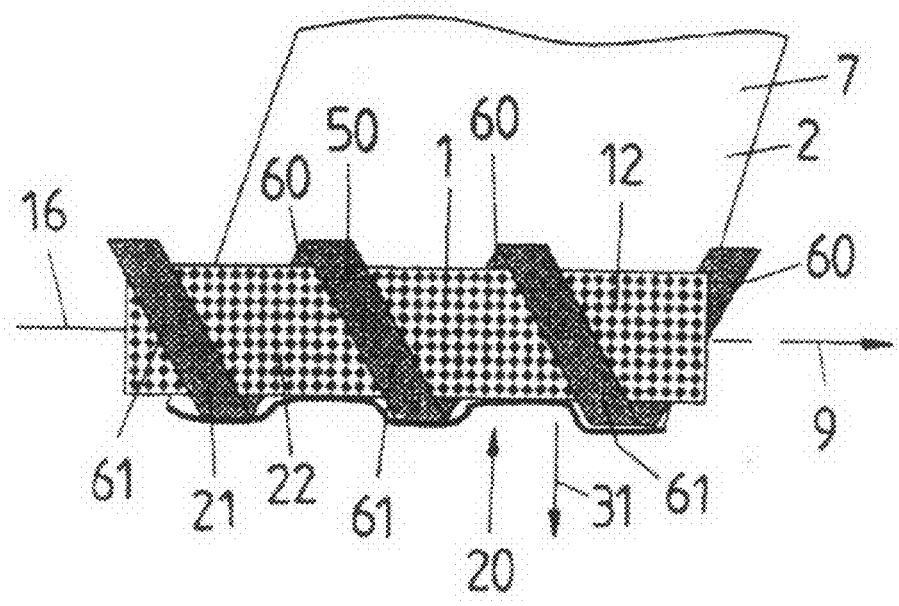

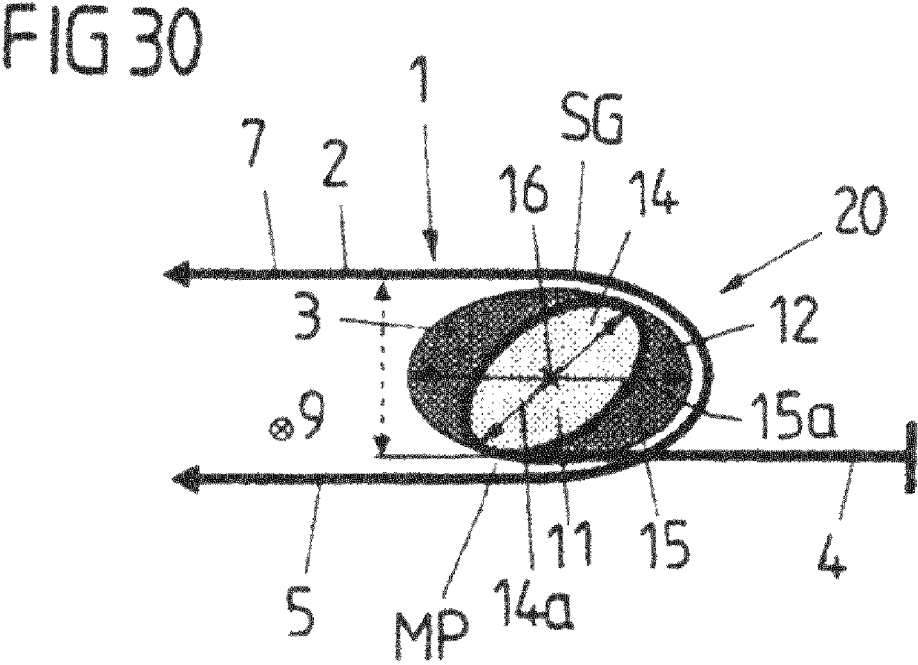
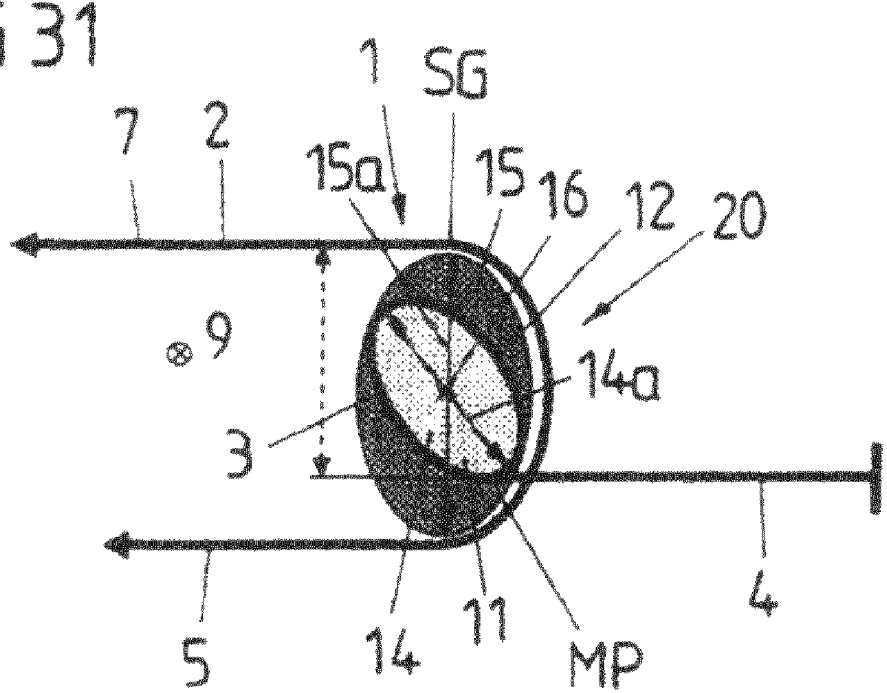

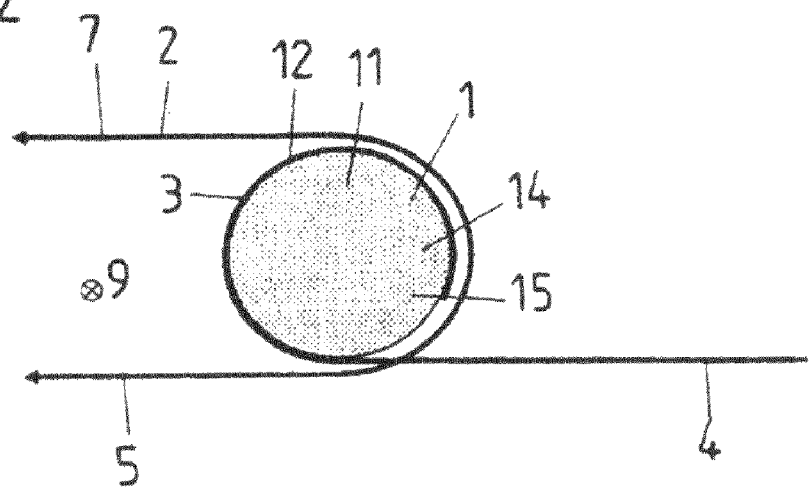
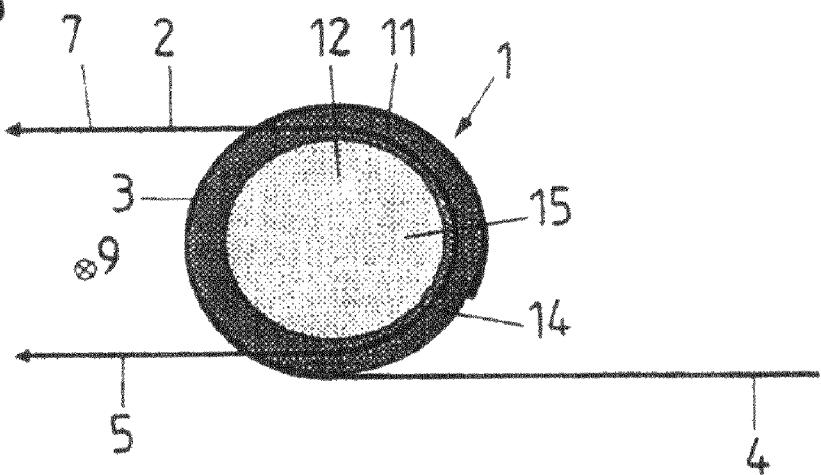
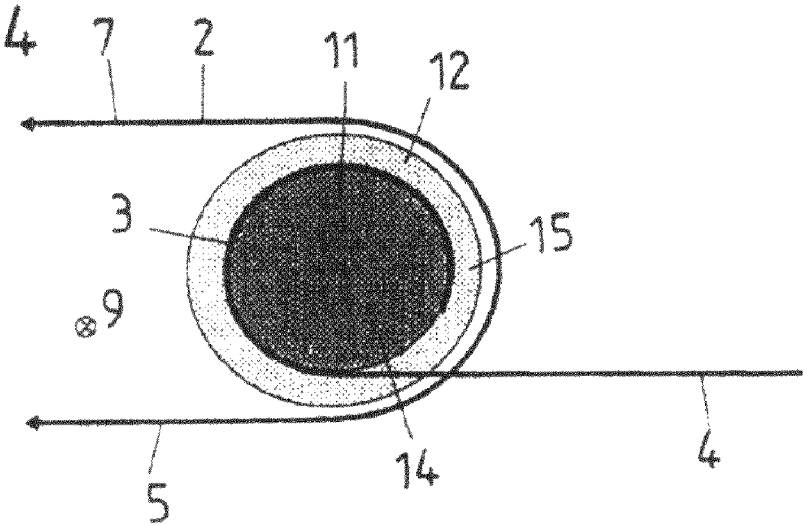

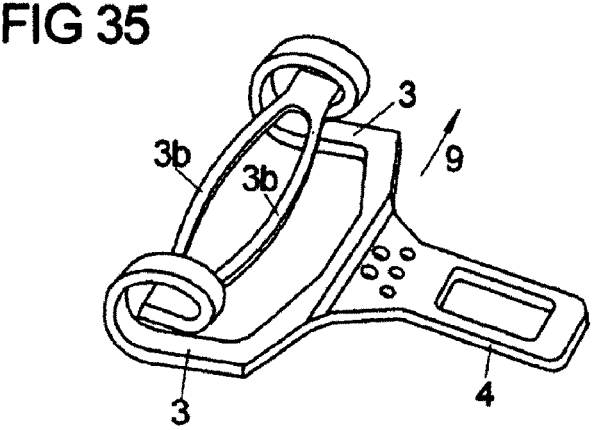
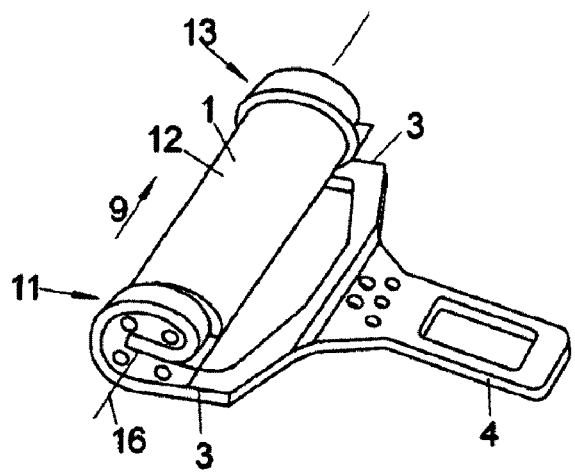
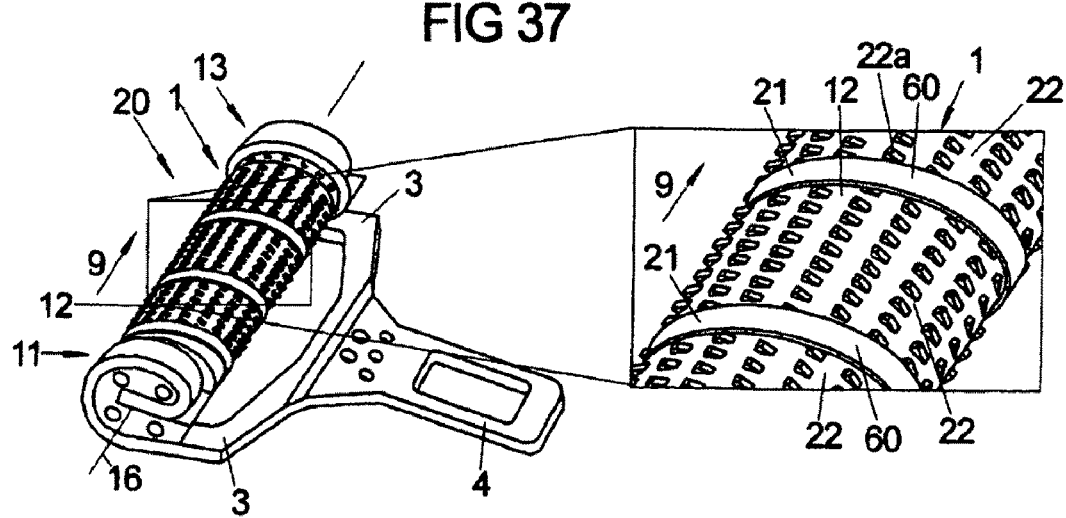

BUCKLE DEVICE

CROSS-REFERENCE TO RELATED PATENT APPLICATIONS

This application is a Continuation of International Application No. PCT/EP2008/51691, filed Feb. 12, 2008, which claims priority to German Utility Model Application 10 2007 007 702.7, filed Feb. 12, 2007, and German Utility Model Application 10 2007 047 549.9, filed Sep. 28, 2007. All of the foregoing applications are incorporated herein by reference in their entireties.

BACKGROUND

The application relates to a buckle device for a motor vehicle, comprising a locking tongue for inserting into a buckle and a deflecting body coupled to the locking tongue, which is configured to subdivide a safety belt into a shoulder portion and a lap portion, and to deflect said safety belt such that the two portions extend away from the deflecting element in different directions.

SUMMARY

An object of the invention is to provide an improved buckle device.

According to an exemplary embodiment it is provided that the deflecting body is connected to the locking tongue via at least one elongate element, which is at least partially wound around the deflecting body, the elongate element preferably bearing tightly against the deflecting body at least partially. Preferably, the at least one elongate element may be unwound from the deflecting body by a force acting on the shoulder portion, in order to limit the resulting force acting on the shoulder portion. In other words, the deflecting body is set in rotation by forces acting on the shoulder portion, during which the elongate element is unwound from the deflecting body.

Exemplary, the at least one elongate element is unrolled from the deflecting body by a force acting on the shoulder portion, by deformation, in order to limit the resulting force acting on the shoulder portion. Said force is absorbed during deformation of the elongate element.

Exemplary the deflecting body extends in a direction of extension. With a deflecting body in the form of a roller, said direction of extension extends parallel to the rotational axis (cylinder axis) of the roller-shaped deflecting body. In this case, the at least one elongate element is wound around the deflecting body transversely to the direction of extension of the deflecting body, and namely preferably around a free end portion of the deflecting body. This end portion is preferably connected via a central portion of the deflecting body to a further free end portion of the deflecting body, which opposes the other end portion of the deflecting body in the direction of extension of the deflecting body. The three portions are preferably formed integrally with one another.

The two end portions and the central portion have one respective cross-sectional surface, the cross-sectional surfaces of the end portions preferably being configured in a congruent manner and the two end portions and the central portion preferably having a uniform cross section in the direction of extension, and namely both with regard to the cross-sectional contour and with regard to the cross-sectional surface.

In an exemplary variant, the cross-sectional surfaces of the end portions of the deflecting body are respectively greater than the cross-sectional surface of the central portion of the deflecting body. In two further variants of the invention, the cross-sectional surfaces of the end portions are either respectively the same as the cross-sectional surface of the central portion and/or respectively smaller than the cross-sectional surface of the central portion of the deflecting body. The cross-sectional surface is in this case understood as a cross-sectional surface which extends perpendicular to the direction of extension of the deflecting body.

The force which has to be introduced into the deflecting body for unwinding the at least one elongate element from the deflecting body may be controlled by means of the ratio of the cross-sectional surface of an end portion to the cross-sectional surface of the central region. It is significant in this case that by means of the different cross sections (with circular cross sections of a deflecting roller, said cross sections are solely determined by the radius of the deflecting roller located perpendicular to the cylinder axis) the distance between the point over which the end portions (viewed in cross section) unroll (unrolling point) when unwinding the elongate elements and the point from which the shoulder portion (viewed in cross section) extends away from the central portion of the deflecting roller and/or the point from which the lap portion (viewed in cross section) extends away from the central portion of the deflecting roller, is varied.

In the event that, with a deflecting roller, the portions thereof (end portions, central portion) having a common cylinder axis (rotational axis), the cross-sectional surfaces of the end portions are respectively as large as the cross-sectional surface of the central portion, this means that only one force acting on the shoulder portion (and namely the component thereof extending along the shoulder portion) causes the rotation of the deflecting roller (by unwinding the elongate elements), provided it exceeds the threshold force, as only this component has a lever arm relative to the unrolling point, via which a moment of force may be introduced into the deflecting roller for unwinding the elongate elements.

In the event that the central portion of the deflecting body has a cross-sectional surface which is respectively smaller than the cross-sectional surfaces of the end portions of the deflecting body, both the force acting on the shoulder portion and also a force (and namely the component thereof extending along the lap portion) acting on the lap portion pull in the same direction. In this case, both force components acting in the respective belt portions have a lever arm relative to the unrolling point, via which a moment of force may be produced on the deflecting roller, unwinding the elongate elements.

In the event, however, that the end portions respectively have a cross-sectional surface which is smaller than the cross-sectional surface of the central portion, the force acting on the shoulder portion, provided it exceeds the threshold force, causes a rotation of the deflecting roller, whereas the force acting on the lap portion acts counter to this rotation. Both force components acting in the respective belt portions have in this case lever arms relative to the unrolling point, via which moments of force acting in an opposing manner on the deflecting roller may be produced.

Exemplary, the two free end portions of the deflecting body are respectively of cylindrical configuration and have a common cylinder axis coinciding with the direction of extension. Preferably, the central portion of the deflecting body is also of cylindrical configuration, the cylinder axis thereof preferably coinciding with the cylinder axis of the end portions of the deflecting body.

In an exemplary embodiment, the central portion has an elongate cross section, in particular in the form of an oval or an ellipse. An elongate cross section is understood as a cross-sectional shape which has a greater extension in a first direction (longitudinal axis of the cross-sectional surface) than in a second direction oriented transversely to the first direction. The central portion of the deflecting body forms in this manner a lever, the variable length thereof depending on the angular position of the central position in spatial terms. As a result, when rotating the central portion about the rotational axis, the force introduced into the at least one elongate element is varied. By the cross-sectional shape of the central portion, therefore, the amount of force introduced into the at least one elongate element may be controlled (in a path-dependent and/or time-dependent manner). This is also possible if both the cross sections of the end portions and the cross section of the central portion are of elongate configuration. Significant for varying the forces exerted on the elongate elements by the forces acting on the shoulder portion, is respectively the relevant effective lever arm of the central portion of the deflecting body. The length of this lever arm is determined by the distance between the point from which—viewed in cross section—the shoulder portion extends away from the central portion of the deflecting body and the point over which—viewed in cross section—the end portions unroll when the elongate elements are unwound. The same applies to the forces acting on the lap portion.

Exemplary, the deflecting body is connected to the locking tongue via at least one additional deformation element which, when the at least one elongate element is unwound from the deflecting body, is deformed by the absorption of energy. In a variant of the invention, the at least one deformation element is preferably elastically or plastically (inelastically) deformed. In a further variant of the invention, it is provided that the at least one deformation element when the at least one elongate element is unwound from the deflecting body, by the absorption of energy, is curved around at least one axis oriented transversely to a direction of extension of the deformation element. If required, the deformation element may be curved around a plurality of axes spaced apart from one another. The axis may be an imaginary axis. In this case, the deformation element is preferably arranged in the form of a loop.

Alternatively, the aforementioned axis may be formed by a body, about which the deformation element is positioned. In this case, when the at least one elongate element is unwound from the deflecting body, the deformation element, which is configured in particular in the shape of a pin, is preferably pulled out of a cut-out provided on the locking tongue or the deflecting body by the absorption of energy.

In the event that the deformation element is not pulled out of a cut-out, the deformation element may be connected by an end portion to the locking tongue via a weak point, which tears when the at least one elongate element is unwound from the deflecting body by the absorption of energy.

Moreover, the at least one elongate element may be connected to the deflecting body via such a weak point, said weak point tearing when the at least one elongate element is unwound from the deflecting body, by the absorption of energy.

Moreover, the deflecting body is preferably connected to the locking tongue via a further elongate element, which is wound at least partially about the deflecting body. This further elongate element is in this case unwound from the deflecting body in the same manner as the other elongate element by a predeterminable force acting on the shoulder portion, the resulting force acting on the shoulder portion being limited as the deflecting roller unloads the shoulder portion by its unrolling movement.

The further elongate element is preferably wound around the further end portion of the deflecting body, so that the safety belt is positioned along the deflecting body between the two elongate elements about the central portion of the deflecting body.

For the bearing of the safety belt against the deflecting body, said deflecting body has a bearing region about which the safety belt is positioned, and along which the safety belt may slide. The bearing region is preferably provided on the central portion of the deflecting body and is preferably designed and provided to cooperate with the safety belt, such that with a force acting on the shoulder portion, which is greater than or equal to a predeterminable threshold force, the safety belt positioned about the bearing region drives the deflecting body by a frictional force to a rotational movement about the cylinder axis (rotational axis), the at least one elongate element being unwound from the deflecting body.

In this case, said friction between the bearing region and the safety belt, with a force acting on the shoulder portion which is lower than said threshold force, is such that it is possible for the safety belt to slide along the deflecting body without said deflecting body being carried along by the safety belt and completing its unrolling movement.

Exemplary, the bearing region has a first and a second bearing surface, the safety belt, with a force acting on the shoulder portion which is lower than the threshold force, preferably only bearing against the first bearing surface, and the safety belt, with a force acting on the shoulder portion which is greater than or equal to said threshold force, additionally coming to bear against the second bearing surface.

In this case, a friction preferably prevails between the second bearing surface and the safety belt which causes the deflecting body to be carried along by the safety belt, when the safety belt bears against the second bearing surface. Accordingly, between the first bearing surface and the safety belt a friction prevails which allows the safety belt to slide along the deflecting body without the deflecting body being carried along by the safety belt (i.e. the elongate elements are not unwound from the deflecting body) when the safety belt bears against the first bearing surface.

In one exemplary embodiment of the invention, the first bearing surface is formed by a surface facing the safety belt of at least one movable element mounted on the deflecting body, in particular on the central portion of the deflecting body, the second bearing surface being formed by a surface of the central portion of the deflecting body facing the safety belt. In the event of a cylindrical central portion, therefore, the second bearing surface has the shape of a cylindrical outer surface.

Exemplary, the movable element is designed and provided to be moved from a first position into a second position, in the first position the first bearing surface of the movable element projecting along a normal of the second bearing surface beyond said second bearing surface, so that the safety belt positioned around the central portion of the deflecting body in the first position of the movable element may only bear against the first bearing surface and encompasses the central portion of the deflecting body at a distance from the second bearing surface. In the second position of the movable element, said movable element is preferably arranged in a recess of the deflecting body, so that the safety belt comes to bear flat against the second bearing surface. Preferably, the movable element is positively guided through the recess, said recess preferably extending transversely to the direction of extension of the deflecting body and namely preferably in the radial direction of the deflecting body, so that the movable element in its first position may project therefrom transversely to the direction of extension of the deflecting body. In this case, the first bearing surface is formed by a front face of the movable element remote from the second bearing surface, which in the second position of the movable element may seamlessly merge with the second bearing surface.

The movement of the movable element from the first into the second position takes place when a force is introduced into the safety belt bearing against the first bearing surface which exceeds the aforementioned threshold force.

In an exemplary variant, the movable element is supported via a spring element on the deflecting body. This spring element is preferably arranged in the recess of the deflecting body associated with the movable element. The threshold force with which the safety belt has to press against the first bearing surface may be adjusted via the spring constant of the spring element, in order to come to bear additionally against the second bearing surface.

In a further exemplary embodiment, the movable element itself is configured to be able to be deformed elastically or inelastically, so that it may be deformed by the safety belt pressing against the first bearing surface of the movable element from the first position into the second position, and namely when the force introduced into the shoulder portion of the safety belt exceeds the aforementioned threshold force.

In a further exemplary variant, the movable element is of rigid configuration and secured by a connecting means to the deflecting body in the first position. Preferably, this connecting means is designed and provided to be sheared off for moving the movable element into the second position, when a force acting on the shoulder portion exceeds said threshold force and the safety belt, therefore, presses the movable element with sufficient force into the associated recess of the deflecting body.

In an alternative exemplary variant, the connecting means produces a latching connection between the deflecting body and the movable element, said latching connection in particular being formed by a ball which is pressed by a spring element, in particular in the form of a leaf spring, into a cut-out configured on the movable element, of the movable element guided through the aforementioned recess and namely transversely to the direction of movement of the movable element, so that said movable element is secured in its first position on the deflecting body. If the movable element is pressed with sufficient force by the safety belt into the recess, namely when a force acts on the shoulder belt which is above the threshold force, the ball is forced out of the cut-out and the movable element may be moved into its retracted second position, in which the safety belt bears flat against the second bearing surface.

In one exemplary embodiment, the movable element is configured as a pin, which is positively guided in a corresponding recess of the deflecting body. Preferably, the movable element extends in an alternative variant—relative to the direction of extension of the deflecting body—along the entire width of the central portion of the deflecting body.

In an alternative exemplary embodiment, the movable element is configured as a leaf spring covering the recess, with a surface facing the safety belt which forms the first bearing surface.

Exemplary, the leaf spring is curved in its first position toward the safety belt, so that it projects with its first bearing surface from the recess, the first bearing surface on a peripheral outermost edge of the first bearing surface merging flush, i.e. seamlessly, with the surrounding second bearing surface configured on the deflecting body. In the first position of the safety belt, therefore, only bears against the convex first bearing surface of the leaf spring and may therefore slide along the deflecting body. If the force acting on the shoulder portion exceeds the predeterminable threshold force, the safety belt presses the leaf spring into the recess of the deflecting body located thereunder, i.e. the curvature of the leaf spring is reversed, so that the curvature in the second position projects into the recess. Now the safety belt bears flat against the second bearing surface bordering the recess and carries along the deflecting roller. The movement of the leaf spring from the first into the second position corresponds, therefore, to a reversal of the curvature of the leaf spring (by elastic deformation of the leaf spring).

Naturally, a plurality of the movable elements described above may also be provided. Said movable elements are preferably distributed along the deflecting body and preferably movably mounted on the deflecting body respectively along a normal of the second bearing surface. Preferably, the movable elements are, in particular, evenly distributed over the surface of the second bearing surface with which the safety belt comes into contact in the second position of the movable elements.

In a further exemplary variant, the movable element extends along the deflecting body, in particular in the form of a resilient wire clamp which may be pressed by the safety belt bearing thereagainst continuously from the first position in which the safety belt slides along the wire clamp, into the second position, in which the wire clamp is flush-mounted in the associated recess of the deflecting body. The recess thus has along the surface (second bearing surface) of the deflecting body a path corresponding to the wire clamp, so that the first bearing surface configured on the wire clamp moves back along a normal of the second bearing surface at least as far as the level of the second bearing surface, if the wire clamp is flush-mounted in the aforementioned recess of the deflecting body (second position). The movement of the wire clamp from the first into the second position takes place by the safety belt bearing against the first bearing region (i.e. on the wire clamp). If the force acting on the shoulder portion namely exceeds the aforementioned threshold force, the safety belt presses the wire clamp counter to the restoring force thereof into said recess of the deflecting body associated with the wire clamp, which serves for receiving the wire clamp.

Exemplary, the movable element (for example in the form of the wire clamp) encompasses the deflecting body in cross section, so that the safety belt in the first position of the movable element may be held at a distance therefrom over the entire surface of the second bearing surface.

To this end, the movable element has a rectangular path along the surface (second bearing surface) of the deflecting body, with first portions which extend in the direction of extension of the deflecting body and second portions extending transversely to these first portions, which respectively connect two first portions extending in the direction of extension to one another, and at the same time at least partially encompass the deflecting body transversely to the direction of extension of the deflecting body.

In a further exemplary embodiment, the first bearing surface projects beyond the second bearing surface along a normal of the second bearing surface in a static manner, so that the belt, with a force acting on the shoulder portion which is lower than the predeterminable threshold force, only bears against the first bearing surface, whereas the safety belt, with a force acting on the shoulder portion which is greater than or equal to said threshold force, is deformed such that it fits tightly against the second bearing surface (and the first bearing surface).

The first bearing surface is in this case provided by a projection projecting from the deflecting body, and namely by the surface thereof remote from the deflecting body which faces the safety belt.

Exemplary, the projection surrounds the deflecting body in an annular manner transversely to the direction of extension, preferably a plurality of such projections being provided which surround the deflecting body in the direction of extension at a distance from one another. As a result, on the deflecting body peripheral recesses are formed, the bases thereof respectively forming parts of the second bearing surface. If a force acts on the shoulder portion which exceeds the predeterminable threshold force, the safety belt is pulled into said recesses and comes to bear additionally against the second bearing surface, which increases the friction between the belt and the deflecting body to such an extent that the safety belt carries along the deflecting body, the at least one elongate element being unrolled from the deflecting body.

In an alternative exemplary variant, the projection extends in a helical manner about the deflecting body, so that the first bearing surface comprises first portions which are oriented in the direction in which the shoulder portion extends away from the deflecting body, as well as second portions which are oriented in the direction in which the lap portion extends away from the deflecting body.

Exemplary, the aforementioned projections are formed integrally on the deflecting body and therefore preferably form an integral component of the deflecting body.

Exemplary, the elongate elements are integrally formed on the locking tongue and preferably consist of a metal, in a similar manner to the locking tongue.

Similarly, the deflecting body preferably consists of a metal. The increased friction coefficient of the second bearing surface of the deflecting body is preferably achieved by structuring the second bearing surface. In other words, the second bearing surface has a plurality of small raised portions which significantly increase the effective surface of the second bearing surface relative to the first bearing surface, and thus also the friction between the safety belt and the second bearing surface of the deflecting roller.

Exemplary, the raised portions are of saw-toothed (triangular) configuration (locking lugs), the raised portions preferably having in cross section two sides extending at an acute angle to one another which may have a variable gradient, however, relative to a normal of the second bearing surface, i.e. the raised portions (locking lugs) are preferably configured to be directionally dependent, and namely such that a greater resistance is provided against a relative movement between the deflecting body and the safety belt, as a result of a force introduced via the lap portion, than with a force introduced via the shoulder portion. The raised portions may engage in structures of the safety belt and/or engage behind said structures—generally produced from individual fibers—so that between the safety belt and the raised portions of the second bearing surface a positive connection is produced, if the safety belt presses against the second bearing surface with a predeterminable threshold force. Preferably, the tips of the raised portions are flattened so that the safety belt is not too greatly stressed.

BRIEF DESCRIPTION OF THE DRAWINGS

Further features and advantages of the invention are clarified in the following description of embodiments with reference to the figures, in which:

FIG. 9: shows a schematic sectional view of a deflecting body of a buckle device according to the invention, with a safety belt positioned about the deflecting body, the deflecting body comprising a first and a second bearing surface, and the friction coefficient of the second bearing surface being greater than that of the first bearing surface.

FIG. 10: shows a schematic sectional view of a deflecting body of a buckle device according to the invention, with a safety belt positioned about the deflecting body, the deflecting body comprising a first and a second bearing surface, and the friction coefficient of the second bearing surface being greater than that of the first bearing surface.

FIG. 11: shows a schematic sectional view of a deflecting body of a buckle device according to the invention with movable elements elastically mounted thereon, the front faces thereof forming the first bearing surface.

FIG. 12: shows a schematic sectional view of a deflecting body of a buckle device according to the invention with movable elements elastically mounted thereon, the front faces thereof forming the first bearing surface.

FIG. 17: shows a schematic sectional view of a further modification of the deflecting body shown in FIGS. 11 and 12, in which the movable elements are secured by means of a latching connection to the deflecting body in a disengaged position.

FIG. 18: shows a schematic sectional view of a further modification of the deflecting body shown in FIGS. 11 and 12, in which the movable elements are secured by means of a latching connection to the deflecting body in a disengaged position.

FIG. 19: shows a schematic sectional view of a further modification of the deflecting body shown in FIGS. 11 and 12, in which the movable elements are configured as leaf springs.

FIG. 20: shows a schematic sectional view of a further modification of the deflecting body shown in FIGS. 11 and 12, in which the movable elements are configured as leaf springs.

FIG. 21: shows a schematic sectional view of a further modification of the deflecting body shown in FIGS. 11 and 12, in which a movable element is provided in the form of a wire clamp.

FIG. 22: shows a schematic sectional view of a further modification of the deflecting body shown in FIGS. 11 and 12, in which a movable element is provided in the form of a wire clamp.

FIG. 25: shows a schematic sectional view of a further modification of the deflecting body shown in FIGS. 23 and 24.

FIG. 26: shows a schematic sectional view of a further modification of the deflecting body shown in FIGS. 23 and 24.

FIG. 30: shows a schematic sectional view of a deflecting body which comprises two end portions which are connected to one another via a central spacing, both the end portions and also the central portion comprising an oval cross section.

FIG. 31: shows a schematic sectional view of a deflecting body which comprises two end portions which are connected to one another via a central spacing, both the end portions and also the central portion comprising an oval cross section.

FIG. 32: shows a schematic sectional view of a deflection body in the form of a roller, the central portion of the deflecting body having a diameter which is the same, smaller or greater than the diameter of the two end portions of the deflecting body.

FIG. 33: shows a schematic sectional view of a deflection body in the form of a roller, the central portion of the deflecting body having a diameter which is the same, smaller or greater than the diameter of the two end portions of the deflecting body.

FIG. 34: shows a schematic sectional view of a deflection body in the form of a roller, the central portion of the deflecting body having a diameter which is the same, smaller or greater than the diameter of the two end portions of the deflecting body.

FIG. 35: shows a perspective view of a buckle device according to the invention with a deflecting body of the type shown in FIGS. 25 and 26.

FIG. 36: shows a perspective view of a buckle device according to the invention with a deflecting body of the type shown in FIGS. 25 and 26.

FIG. 37: shows a perspective view of a buckle device according to the invention with a deflecting body of the type shown in FIGS. 25 and 26.

DETAILED DESCRIPTION

Figure 5:
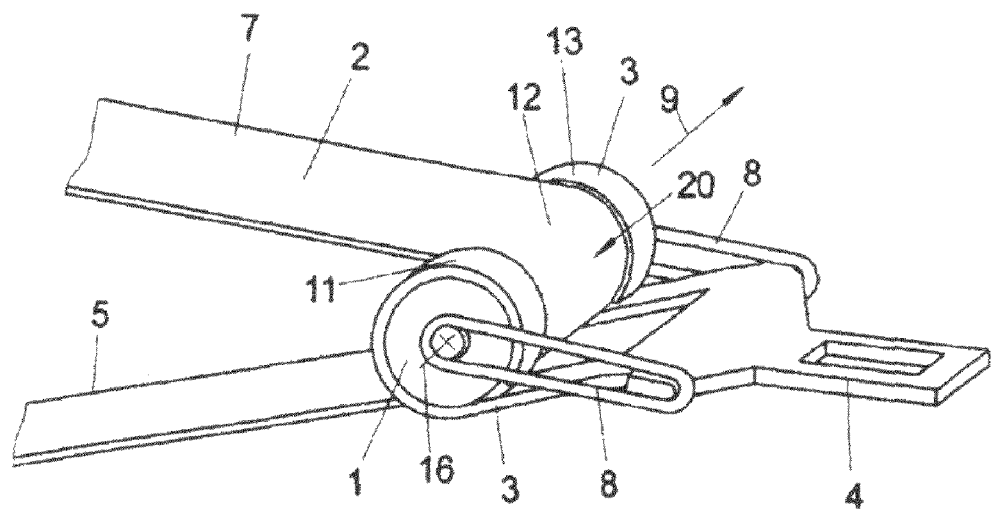
FIG. 5: shows a perspective view of a buckle device according to the invention, in which a deflecting body is connected to a locking tongue via elongate elements wound around the deflecting body, the deflecting body being connected to the locking tongue via additional expandable deformation elements.

FIG. 5 shows a schematic perspective view of a buckle device according to the invention. The buckle device has a locking tongue 4 for inserting into a buckle (not shown) which is generally secured to a vehicle chassis or to a vehicle seat. The locking tongue 4 is connected via two elongate elements 3 to a deflecting body 1, which serves for deflecting a safety belt 2. This safety belt 2 may, for example, be a known three-point safety belt which, starting from a belt storage unit (for example a belt roller), extends as far as a deflection fitting for a shoulder belt mounted on the motor vehicle approximately level with the shoulder of a person strapped in according to requirements, is deflected thereby and is then guided diagonally over the chest of said person to the deflecting body 1, from where it extends along the lap of the driver to a belt anchoring point. The safety belt 2 is thus positioned around the deflecting body 1 and said deflecting body subdivides the safety belt 2 into a shoulder portion 7 extending diagonally over the upper body of said person and a lap portion 5 extending along the lap.

The deflecting body 1 extends in a direction of extension 9 and in the embodiment shown in FIG. 5 is configured as a deflection roller, the cylinder axis 16 thereof extending parallel to said direction of extension 9. The deflecting body 1 has two free end portions 11, 13 which oppose one another in the direction of extension 9 and/or the cylinder axis 16 and are, in particular, connected integrally to one another via a central portion 12 of the deflecting body 1. In other words, the three portions 11, 12, 13 are preferably integrally formed with one another.

The locking tongue 4 is thus connected to the deflecting body 1 by means of the two elongate elements 3 via the two end portions 11, 13, by said two end portions being guided, proceeding from the locking tongue 4 transversely to the direction of extension 9, to one respective associated end portion 11, 13 of the deflecting body 1 and are wound around said deflecting body. In this case, the two elongate elements 3 are respectively wound around the associated end portion 11, 13 in the same direction, the elongate elements 3 encompassing the respective end portion 11, 13 preferably by 180° to 360°. Preferably the elongate elements 3 are fixedly connected to the deflection roller 1 via their respective end (for example by a welded connection or a positive connection).

The elongate elements 3 are configured and arranged on the deflecting body 1 such that the deflecting body 1 is arranged at a distance from the locking tongue 4 transversely to the direction of extension 9 and together with the elongate elements 3 and the locking tongue 4 defines a through opening of the buckle device, through which the safety belt 2 positioned around the deflecting body 1 is guided.

In this case the safety belt 2 bears against a bearing region 20 of the deflecting body 1, which is configured on the central portion 12 of the deflecting body 1. The bearing region 20 is made such that the safety belt 2 may slide along the bearing region 20. However, if a force acts on the shoulder portion 7 which exceeds a predeterminable threshold force, the bearing region 20 alters its properties such that now an increased friction prevails between the safety belt 2 and the bearing region 20, which has the result that the safety belt is prevented from sliding along the bearing region 20, and the safety belt 2 carries along the deflecting body 1. As a result, the elongate elements 3 are unrolled from the end portions 11, 13 of the deflecting body 1, which results in the limitation of the resulting force acting on the shoulder portion 7. The bearing region 20 is made such that the predeterminable threshold force is exceeded in the event of a deceleration of the motor vehicle which is typical of a collision, in which a person strapped in according to requirements by means of the safety belt 2 falls with a corresponding velocity into the safety belt 2.

If required, additional (optional) deformation elements 8 may be provided for energy absorption. In the embodiment shown in FIG. 5 in this case there are two elastically deformable elements in the form of a closed loop which respectively connect an axle end projecting along the cylinder axis 16 from the deflecting body 1 to the locking tongue 4. To this end, such a deformation element 8 encompasses with a loop portion an axle end of the deflecting body 1 aligned with the cylinder axis 16 and is suspended by an opposing loop portion under pretension on a hook configured on the locking tongue 4. When the elongate elements 3 are unrolled from the deflecting body 1 the two deformation elements 8 expand by the absorption of energy.

Figure 7:
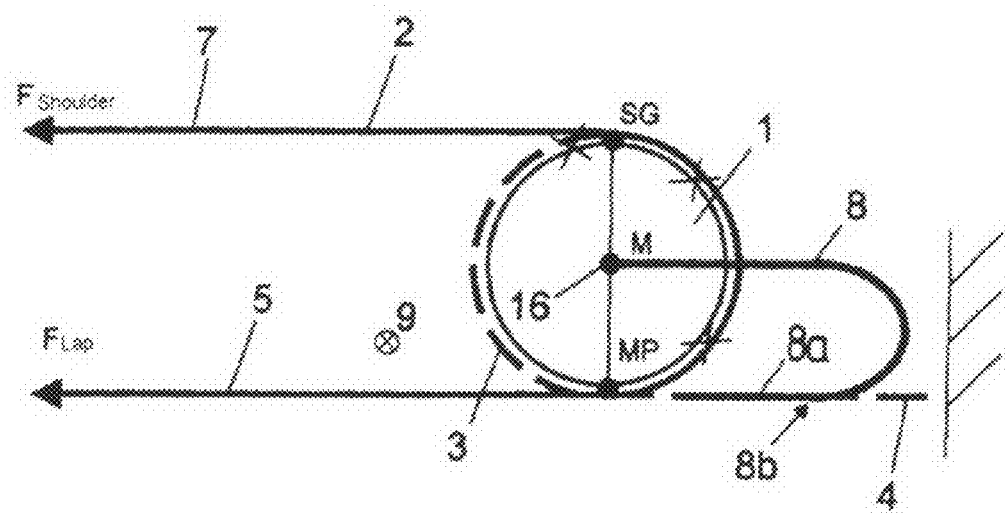
FIG. 7: shows a schematic sectional view of a modification of the buckle device shown in FIGS. 5 and/or 6, in which the deformation element is formed as a deformable link.

FIG. 7 shows an alternative embodiment, in which in contrast to FIG. 5 the deformation element 8 is configured as an inelastically (plastically) deformable link, which in turn connects an axle end of the deflecting body 1 (or a corresponding region of the deflecting body) to the locking tongue 4, the link enclosing an angle of at least 180°. Moreover, the link 8 is connected by an end portion 8a via a weak point 8b to the locking tongue 4. When unrolling and/or unwinding the elongate elements 3 from the deflecting body 1, the link 8 is initially subjected to bending deformation, by which the link 8 is initially pulled straight. With the increasing distance between the deflecting body 1 and the locking tongue 4, forces are introduced via the link 8, which is pulled straight, into the weak point 8b, which as a result tears in a controlled manner—also by absorbing energy—possibly until the weak point 8b is completely separated.

Figure 6:
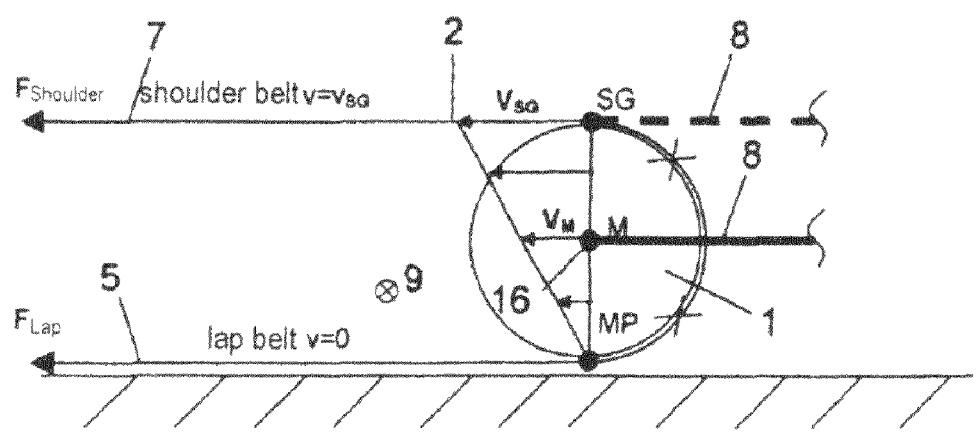
FIG. 6: shows a schematic sectional view of a modification of the buckle device shown in FIG. 5 with deformation elements in the form of removable pins.

In the embodiment according to FIG. 6, the deformation element 8 is configured as a removable pin, which connects the deflecting body 1 (deflection roller) in the region of the cylinder axis 16 to the locking tongue 4. Alternatively or additionally it is possible to provide such a pin 8 on a region of the deflecting body 1, from which the shoulder portion 7 extends from the deflection roller. Preferably, the direction of extension of the pin 8 is in this case aligned with the direction in which the shoulder portion 7 extends away from the deflecting body 1. Energy is preferably absorbed with a deformation element 8 configured as a pin, by the pin 8 being removed from a cut-out provided on the locking tongue 4 (or possibly the deflecting body 1) when the elongate elements 3 unroll—the deflecting body 1 thus moving away from the locking tongue 4. In this case, the pin 8 may be held by the cut-out, such that a predeterminable resistance is provided against the removal of the pin 8. Preferably this resistance is provided by the pin 8 being bent about one or more axes when removed from the associated cut-out.

Provided the pin 8 is intended to be connected to the cylinder axis 16 (possibly via an axle end) of the deflection roller 1, the pin 8 is preferably mounted in an articulated manner so that it does not impair the rotation of the deflection roller 1. When attaching the pin 8 with a lever arm relative to the cylinder axis 16, the pin 8 may be wound onto an additional cylindrical surface, so that the lever arm remains constant. When the winding surface is not at a uniform distance from the cylinder axis 16, it is possible to characterize specifically the force limitation, for example as degressive or progressive.

Figure 8:
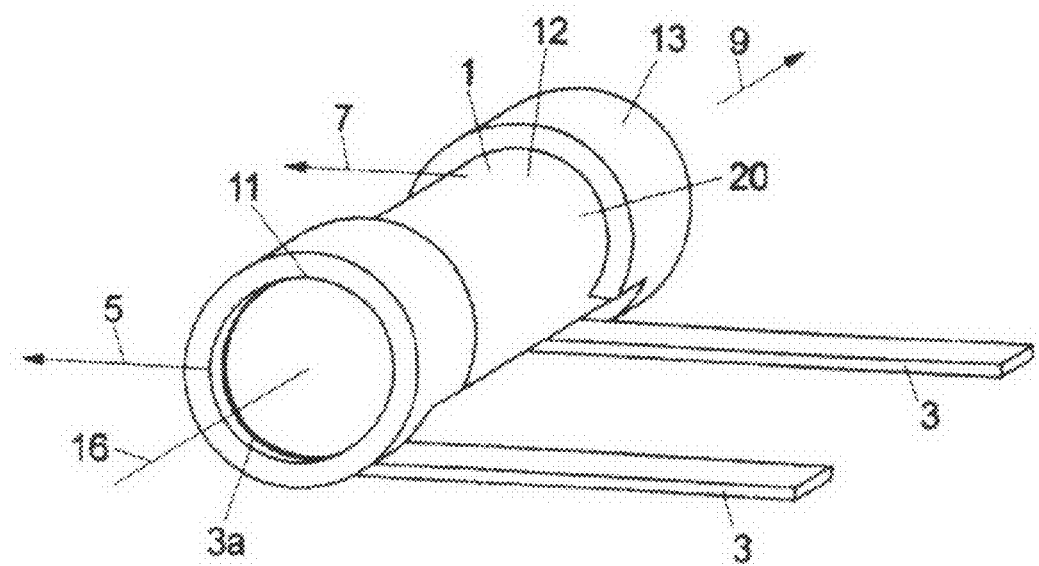
FIG. 8: shows a perspective view of a modification of the buckle device shown in FIG. 5.

FIG. 8 shows a further embodiment in which in contrast to FIGS. 5 and 7 no additional deformation elements 8 are provided. Instead, in the buckle device shown in FIG. 8, the regions of the elongate elements 3 wound around the end portions 11, 13 of the deflecting body 1 are themselves connected via destructible connections 3a (weak points 3a) to the end portions 11, 13 of the deflecting body 1, in order to provide an additional defined (controllable) resistance against the unwinding of the elongate elements 3 from the deflecting body 1 by tearing along the weak points 3a. To make the weak points 3a visible, the end portion 11 has been shown set back relative to the front elongate element 3.

So that from a specific threshold force the safety belt 2 may carry along the deflecting body 1, so that the elongate elements 3 may be unrolled from the deflecting body 1, the bearing region 20 of the deflecting body 1 must be able to adopt two states depending on the force acting on the safety belt 2, the one state of the bearing region 20 being characterized in that the safety belt 2, with forces acting thereon which are below the predeterminable threshold force, may slide along the bearing region 20 without the elongate elements 3 being unrolled. The other state is, in contrast, characterized in that between the safety belt 2 and the bearing region 20 a frictional or positive connection is produced, which prevents a relative movement between the safety belt 2 and the bearing region 20 when the forces acting on the shoulder portion 7 exceed said threshold force.

The bearing region 20 has, therefore, according to FIGS. 9 and 10 a first bearing surface 21 against which the safety belt 2 bears, when the forces acting on the shoulder portion 7, are below the threshold force, as well as a second bearing surface 22 against which the safety belt 2 bears, when the aforementioned forces exceed the threshold force. In this case, the friction between the first bearing surface 21 and the safety belt 2 is such that the safety belt 2 may slide along the first bearing surface 21, whereas the friction between the second bearing surface 22 and the safety belt 2 is such that the safety belt 2 bearing against the second bearing surface 22 may introduce a force into the deflecting body 1, due to which the deflecting body 1 is carried along by the safety belt 2 and the elongate elements 3 are unrolled from the deflecting body 1.

According to the embodiment of the deflecting body 1 shown in FIGS. 11 and 12, movable elements 30 are mounted on the deflecting body 1 which may be moved to and fro between a first and a second position. The movable elements 30 are in this case respectively positively guided in a slot-shaped or possibly blind hole-shaped recess 33 of the deflecting body 1, which respectively extends along a normal 31 relative to the surface 22 of the deflecting body 1. In their first position, the movable elements 30 project with a front face 21 facing the safety belt 2, from the respectively associated recess 33. In this case, the safety belt 2 positioned around the deflecting body 1 only bears against those front faces 21 which in their entirety form the first bearing surface 21.

The movable elements 30 are respectively supported via a spring element 32 on a base of the recesses 33 respectively associated with the movable elements 30. Against the counter force provided by the spring elements 32, each movable element 30 may be moved from its disengaged first position into its second position according to FIG. 12, in which the safety belt 2 comes to rest flat against the outer surface 22 facing outwards of the central portion 12 of the deflecting body 1. The second bearing surface 22 is thus formed by the surface 22 of the central portion 12 of the deflecting body 1 bordering the recesses 33 of the movable elements 30. The movement of the movable elements 30 from the first position into said second position is effected by the safety belt 2, which presses the movable elements 30 into the recesses 33, provided the force acting on the shoulder portion 7 exceeds the aforementioned threshold force.

Figure 13:
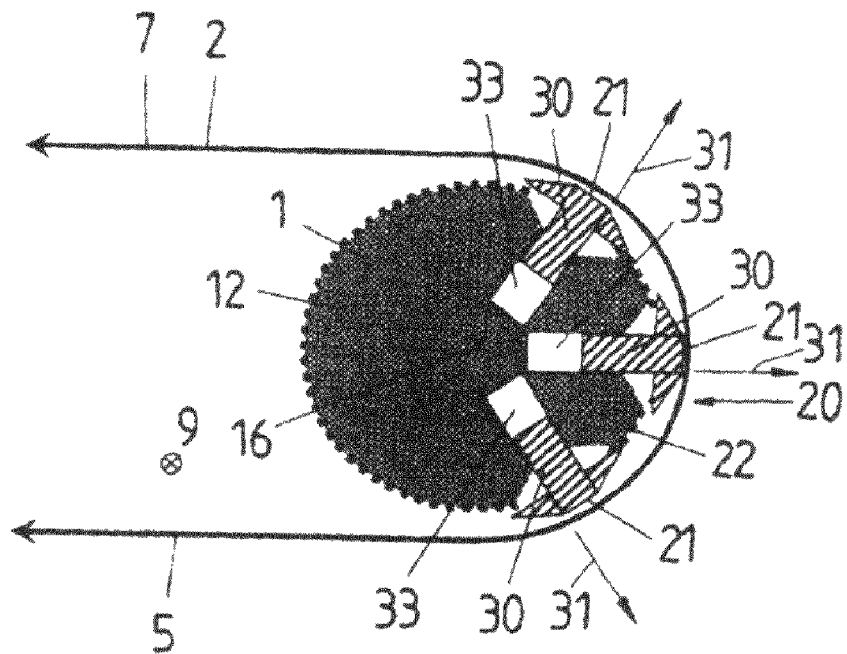
FIG. 13: shows a schematic sectional view of a modification of the deflecting body shown in FIGS. 11 and 12.
Figure 14:
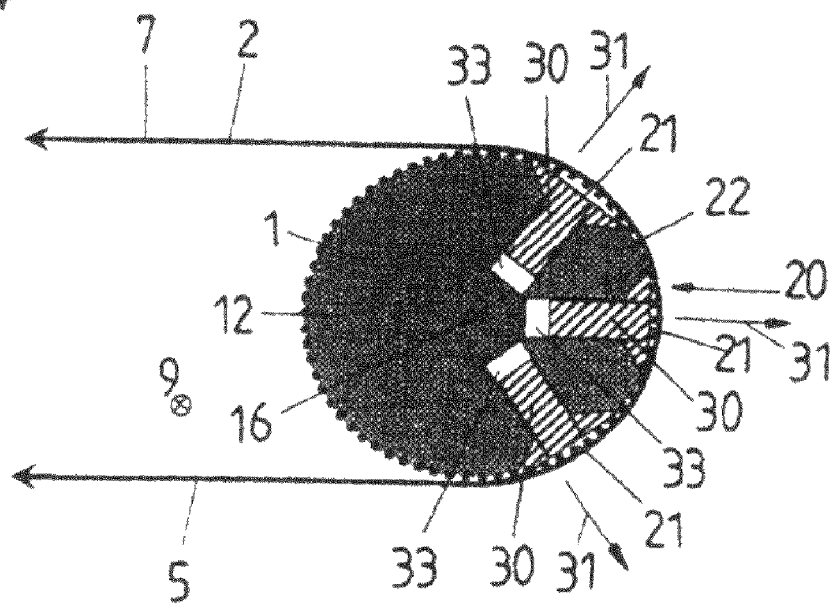
FIG. 14: shows a schematic sectional view of a modification of the deflecting body shown in FIGS. 11 and 12.

FIGS. 13 and 14 show a modification of the deflecting body 1 shown in FIGS. 11 and 12, in which in contrast to FIGS. 11 and 12 the movable elements 30 are not held in their first position by spring elements 32, but by their own elasticity. In this connection, the movable elements 30 respectively comprise a widened head, with a surface 22 facing the safety belt 2, these surfaces 22 in their entirety forming the first bearing surface 22. In the first position, these heads rest with an outermost peripheral edge region on an edge region bordering the respective associated recess 33, so that the first bearing surfaces 21 (surfaces of the heads) project over said second bearing surface 22 along a normal 31 of the second bearing surfaces 22 (surface of the deflecting body). The safety belt 2 may, therefore, in this first position of the movable (elastic) elements 30 only bear against said heads of the movable elements 30 (first bearing surface). If the force acting on the shoulder portion 7 exceeds the predeterminable threshold force, the safety belt 2 presses the movable elements 30 by elastic deformation of the heads of the movable elements 30 into their associated recesses 33, so that the safety belt 2 comes to bear flat against the second bearing surface 22. The deformed heads are in this case preferably positively received by correspondingly formed (conical) widened portions of the recesses 33.

Figure 15:
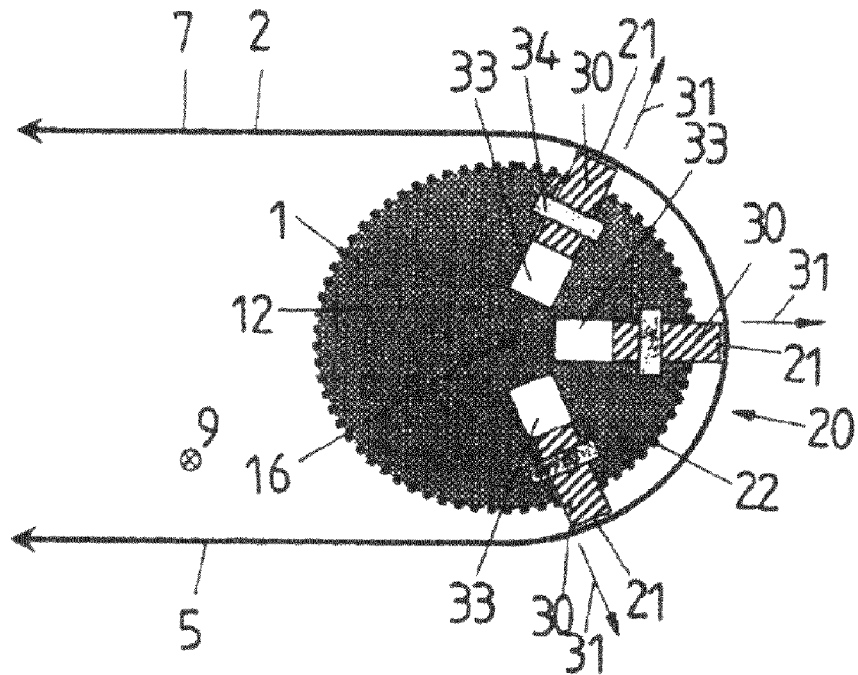
FIG. 15: shows a schematic sectional view of a further modification of the deflecting body shown in FIGS. 11 and 12, the movable elements being connected to the deflecting body by means of a connection which may be sheared off.
Figure 16:
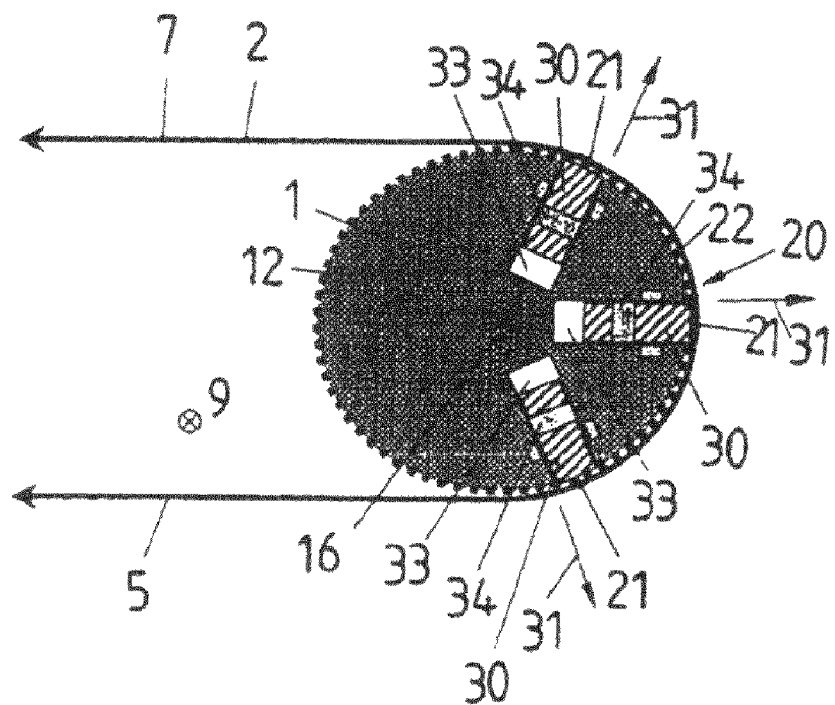
FIG. 16: shows a schematic sectional view of a further modification of the deflecting body shown in FIGS. 11 and 12, the movable elements being connected to the deflecting body by means of a connection which may be sheared off.

FIGS. 15 and 16 show a modification of the deflecting body 1 shown in FIGS. 11 and 12, in which in contrast to FIGS. 11 and 12, the movable elements 30 are not held by spring elements 32 in their first disengaged positions, but by a connecting means 34 which may shear off and which projects from the movable elements 30 respectively transversely to their direction of movement 31 which is oriented perpendicular to the second bearing surface 22, and engages in a cut-out which is configured on a wall of the relevant recesses 33. If the force acting on the shoulder portion 7 exceeds the threshold force, the safety belt 2 presses against the movable elements 30 such that the connecting means 34 are sheared off from the movable elements 30 and the movable elements 30 are respectively engaged in their second position, so that the safety belt 2 comes to bear against the second bearing surface 22.

FIGS. 17 and 18 show a modification of the deflecting body 1 shown in FIGS. 15 and 16, in which the movable elements 30 are respectively held in the first position by a reversible connecting means 34 operating without causing damage. To this end, one respective cut-out 37 is provided on the movable elements 30, into which a ball 35 acted upon by means of a leaf spring 36 is pressed transversely to the direction of movement 31 of the respective movable element 30, so that the safety belt 2 pressing against the movable elements 30 may move the movable elements 30 initially into their second engaged position, when the force acting on the shoulder portion 7 exceeds the threshold force. If this is the case, the balls 35 are pressed against the force of the leaf springs 36 out of the cut-outs 37, and the movable elements 30 reach their engaged second positions according to FIG. 18.

FIGS. 19 and 20 show a further embodiment of a deflecting body 1 according to the invention, in which the movable elements 30 are configured as leaf springs. In this case, each leaf spring 30 is arranged over a recess 33 associated therewith, said leaf spring being supported on an edge region surrounding the relevant recess 33. In its first position, the leaf spring in this case is curved in the direction of the safety belt 2 surrounding the deflecting body 1, so that the safety belt 2 only bears against the leaf springs 30. In other words, the first bearing surface 21 is formed by the surfaces 21 of the leaf springs 30 facing the safety belt 2. If the force acting on the shoulder portion 7 exceeds the threshold force, the safety belt 2 presses against the leaf springs 30 such that their curvature is reversed and projects into the respective recess 33, so that the safety belt 2 comes to bear against the second bearing surface 22 which is formed, as before, by the surface 22 of the deflecting body 1 bordering the recesses 33.

FIGS. 21 to 22 show an embodiment of the deflecting body 1, in which the movable element 30 is formed by a wire clamp, which extends along the surface 22 (second bearing surface 22) of the deflecting body 1. The wire clamp 30 is secured via two free end portions on the deflecting body 1 and has a surface facing the safety belt 2, which forms the first bearing surface 21. The wire clamp 30 may be moved by the supported safety belt 2 from its first position in which the safety belt 2 may not come into contact with the second bearing surface 22 located thereunder, into its second position, in which the wire clamp 30 is arranged in a correspondingly formed recess 33 of the deflecting body 1 such that safety belt 2 may bear against the second bearing surface 22. The movement of the wire clamp 30 from the first into the second position takes place by means of the safety belt 2 in the above-described manner. So that the safety belt 2 in the first position of the wire clamp 30 effectively may be held at a distance from the second bearing surface 22 of the deflecting body 1, the wire clamp 30 has portions 41 extending transversely to the direction of extension 9 which are connected to one another by portions 40 extending in the direction of extension 9, so that a rectangular path of the wire clamp 30 results.

Figure 23:
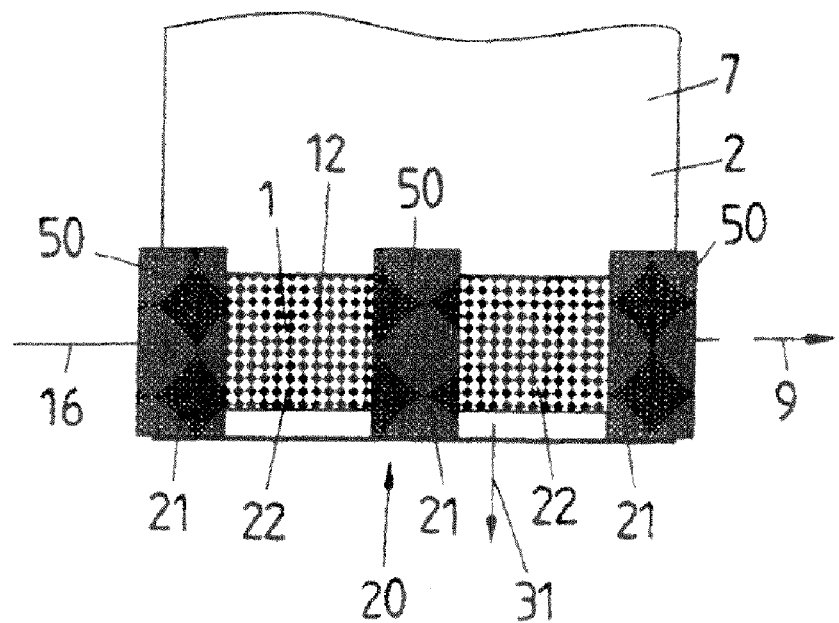
FIG. 23: shows a schematic sectional view of a further modification of the deflecting body shown in FIGS. 11 and 12, with first bearing surfaces which are immobile relative to the deflecting body.
Figure 24:
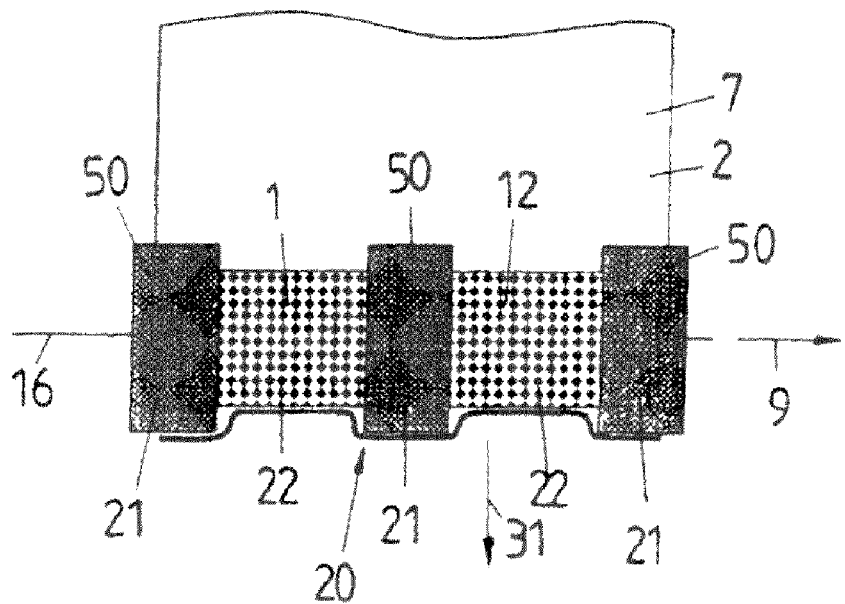
FIG. 24: shows a schematic sectional view of a further modification of the deflecting body shown in FIGS. 11 and 12, with first bearing surfaces which are immobile relative to the deflecting body.

In the deflecting body 1 according to FIGS. 23 and 24, the first bearing surface 21 is formed by the surfaces of projections 50 facing the safety belt 2, which surround the deflecting body 1 transversely to the direction of extension 9 in an annular manner. Between two such peripheral projections 50 the two bearing surfaces 22 extend with their higher friction coefficient. Provided the force acting on the shoulder portion 7 does not exceed the threshold force, the safety belt 2 positioned around the deflecting body 1 only bears against the aforementioned surfaces 21 of the projections 50 (first bearing surface 21). If, however, said force exceeds the threshold force, the safety belt 2 is deformed by the forces acting thereon, such that it also comes to bear against the second bearing surfaces 22, which circulate between the projections 50 (see FIG. 24).

FIGS. 25 and 26 show a modification of the deflecting body 1 shown in FIGS. 23 and 24, in which the projection 50 in contrast to FIGS. 23 and 24 surrounds the deflecting body 1 in a helical manner. In the same manner, therefore, the second bearing surface 22 which is positioned more deeply surrounds the deflecting body 1 in a helical manner. This has the result that portions 60 of the first bearing surface 21 are produced which are oriented in the direction of the path of the belt of the shoulder portion 7 which extends away and opposing second portions 61, which are oriented in the direction of the path of the belt of the lap portion 5 extending away from the deflecting body 1. In this manner, the bearing of the respective portion 7, 5 against the second bearing surface 22 is optimized.

In order to influence the force able to be exerted by the safety belt 2 on the deflecting body 1 and/or the elongate elements 3, the central portion 12 of the deflecting body 1 about which the safety belt 2 is positioned, according to FIG. 34, in cross section may have a greater diameter and/or radius than the two edge portions 11, 13 of the deflecting body 1. Naturally, it is also possible to maintain the diameter of the end portions 11, 13 and of the central portion 12 the same size (FIG. 32) or, however, to reduce the diameter of the central portion 12 relative to the diameter of the end portions 11, 13 (FIG. 33). In the case of the situation shown in FIG. 34 this means that a force acting on the shoulder portion 7 (tensioning the shoulder portion 7) causes a rotation of the deflection roller 1, provided the aforementioned threshold force is exceeded, whereas a force acting on the lap portion 5 and tensioning the lap portion 5 acts counter to such a rotation and/or may be included in the interpretation of the force ratios for limiting the forces acting on the shoulder portion. Thus it is possible to dispense with the use of additional energy absorption devices, as the limitation of the force acting on the shoulder portion may be solely implemented by the unwinding of the elongate elements 3 and the force acting on the lap portion 5. As the resulting shoulder belt force depends on the lap belt force, and said lap belt force on the size of passenger, in such an arrangement the adjustment of the retention on the shoulder portion 7 for the respective passenger is possible and/or becomes self-adapting. A further advantage is that, as a result of the lever arm of the lap portion 5 relative to the unrolling point MP, the rotation of the deflection roller 1 is converted into an additional tensioning of the lap portion 5.

In the case of FIG. 32, only the force acting on the shoulder portion 7 may cause a rotation of the deflection roller 1 (by unwinding the elongate elements 3), whereas in the situation shown in FIG. 33, both the force acting on the shoulder portion 7 and the force acting on the lap portion 5 may effect a rotation of the deflection roller 1.

Figure 27:
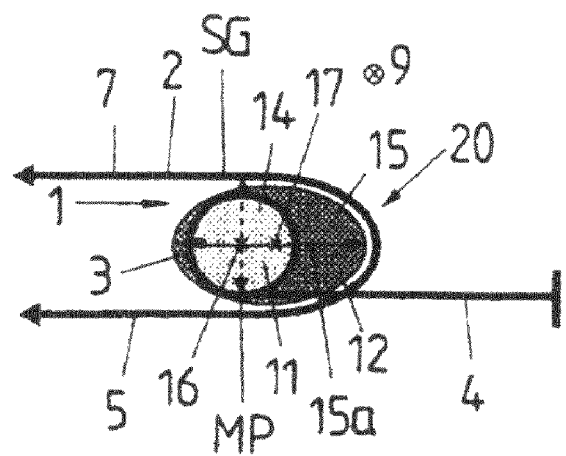
FIG. 27: shows a schematic sectional view of a deflecting body which comprises two end portions which are connected to one another via a central spacing, the central portion comprising an oval cross section.
Figure 28:
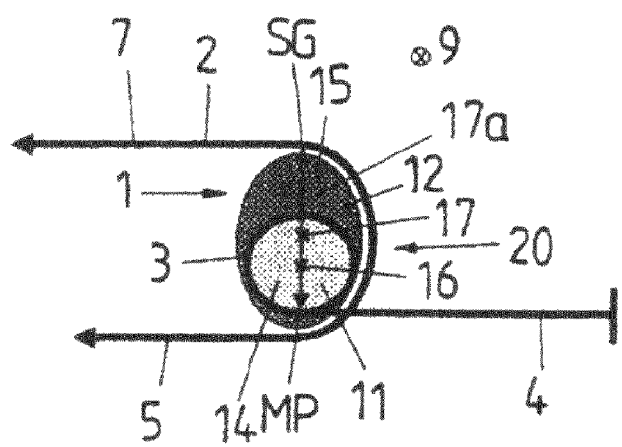
FIG. 28: shows a schematic sectional view of a deflecting body which comprises two end portions which are connected to one another via a central spacing, the central portion comprising an oval cross section.
Figure 29:
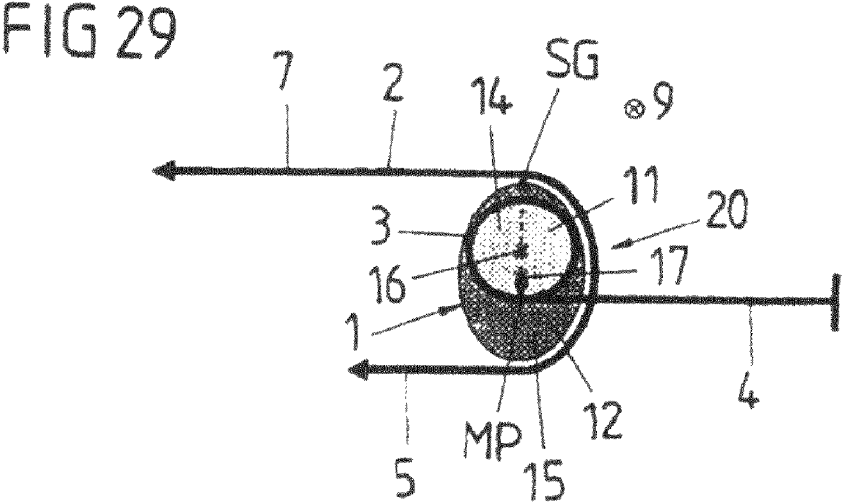
FIG. 29: shows a schematic sectional view of a deflecting body which comprises two end portions which are connected to one another via a central spacing, the central portion comprising an oval cross section.

Moreover, the possibility exists according to FIGS. 27 to 29, to vary the forces exerted on the elongate elements 3 in a path-dependent and/or time-dependent manner, by the central portion 12 containing a shape, which deviates from the circular cylindrical symmetry relative to the cylinder axis or rotational axis 16. If the central portion 12 contains, for example, an elongate cross section (for example elliptical), the central portion 12 has, depending on the angular position, a lever arm of variable length, the length thereof being determined by the distance between the point SG from which (viewed in cross section) the shoulder portion 7 extends away from the central portion 12 of the deflecting body 1 and the point MP over which the end portions 11, 13 (viewed in cross section) unroll.

This may also be effected by the central portion 12 being arranged eccentrically to the cylinder axis 16.

Moreover, in the embodiment according to FIGS. 30 and 31 it is provided that both the central portion 12 and the two end portions 11, 13 respectively have an elongate cross-sectional surface 14, 15 which respectively extend along a longitudinal axis 14a, 15a, the longitudinal axes 14a of the cross sections 14 of the end portions 11, 13 respectively forming a (non-disappearing) angle with the longitudinal axis 15a of the cross section 15 of the central portion 12. Also in this manner, the above-described distance SG-MP and thus the force path when unwinding the elongate elements 3 varies in a path-dependent and/or time-dependent manner.

FIGS. 35 to 37 show a further embodiment of a buckle device according to the invention, in which the locking tongue 4 is integrally formed on the two elongate elements 3. The locking tongue 4 is, together with the elongate elements 3, stamped out as an integral part from a metal piece and subsequently accordingly rolled and bent. The two elongate elements 3 are connected to one another by reinforcing struts 3b, which extend in the direction of extension 9. The reinforcing struts 3b prevent the elongate elements 3 from spreading apart when the belt forces are introduced into the buckle device. The provision of two reinforcing struts 3b serves for improved transmission of the torque, which is introduced into the deflecting body 1 via the force acting on the shoulder portion 7. In order to produce the deflecting body 1, the shaped stamped part (locking tongue 4 and elongate elements 3 configured thereon) are introduced into an injection-molding machine and injection-molded with plastics material around the reinforcing struts 3b. The bearing region 20 according to FIGS. 25, 26 and 37 may also be configured during injection-molding and is then formed integrally on the deflection roller 1. It is also possible to form the bearing region 20 from other materials, in particular metal, and subsequently to apply said bearing region to the deflection roller 1. The increased friction coefficient of the second bearing surface 22 is, in the embodiment shown in FIGS. 35 to 37, preferably produced by structuring the second bearing surface 22 (see FIG. 37). To this end, raised portions 22a are configured on the second bearing surface which, in a cross section extending perpendicular to the direction of extension 9, have two sides running at acute angles to one another which, relative to a normal of the second bearing surface, however, may have a variable gradient, i.e. the raised portions 22a are formed to be directionally dependent and namely such that with a relative movement between the deflecting body 1 and the safety belt 2 as a result of a force introduced via the lap portion 5, a greater resistance is provided than with a force introduced via the shoulder portion 7. Preferably, the tips of the raised portions are flattened in order not to stress the safety belt 2 too greatly.

Hereinafter a principle underlying the invention is to be explained once again with reference to FIGS. 1 to 6.

The central element of this principle is the deflecting body 1 which preferably has the shape of a deflection roller, which may adopt two switchable states. In normal use, the safety belt 2 circulates freely around the deflection roller 1, which requires a low friction coefficient. In the event of an accident, however, this free circulating movement is prevented, either by a frictional connection with a high friction coefficient or by a positive connection. In this manner, the deflection roller 1 and the safety belt 2 form a unit in the region of contact and prevent thereby any movement relative to one another. How the resulting kinematics function in detail is explained hereinafter.

Figure 1:
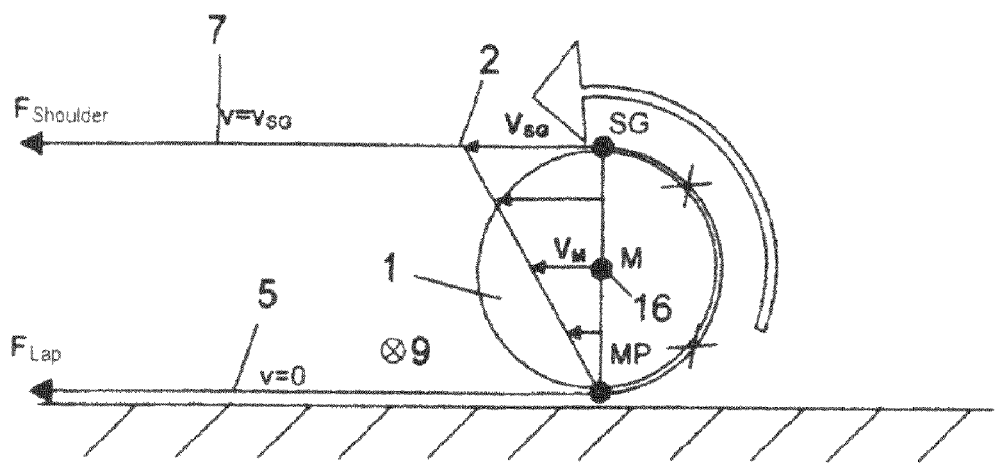
FIG. 1: shows a schematic sectional view of the forces $F_{Shoulder}$ and $F_{Lap}$ acting on the deflecting body.

The deflection roller 1 is, according to FIG. 1, able to unroll on the imaginary plane of the lap portion 5. With this movement, the instantaneous center of rotation MP is located on said plane so that the instantaneous velocity of this point disappears. Due to the fact that no relative movement may take place between the lap portion 5 and the deflection roller 1 in the region of the contact point, the instantaneous velocity of the lap portion 5 is also equal to zero (the point "MP" is located on the lap portion 5). The velocity in the direction of movement increases in a linear manner with the distance from the unrolling plane and achieves its maximum $V_{SG}$ at the highest point SG, which at the same time forms part of the deflection roller 1 and the safety belt. This point SG moves in this case at double the velocity $2*V_M$ of the central point M of the deflection roller 1. Therefore, after a defined displacement of the central point M by s[mm], the point SG shifts by a displacement path of $2*s$[mm]. In contrast, the point MP has not been displaced in a cumulative manner. By this simple kinematic relationship, a device may be constructed which does not release (relax) the lap portion 5 in spite of movable elements and unloads the shoulder portion 7 in a defined manner. The prevention of the relative movement in the contact region is important in this case.

Figure 2:
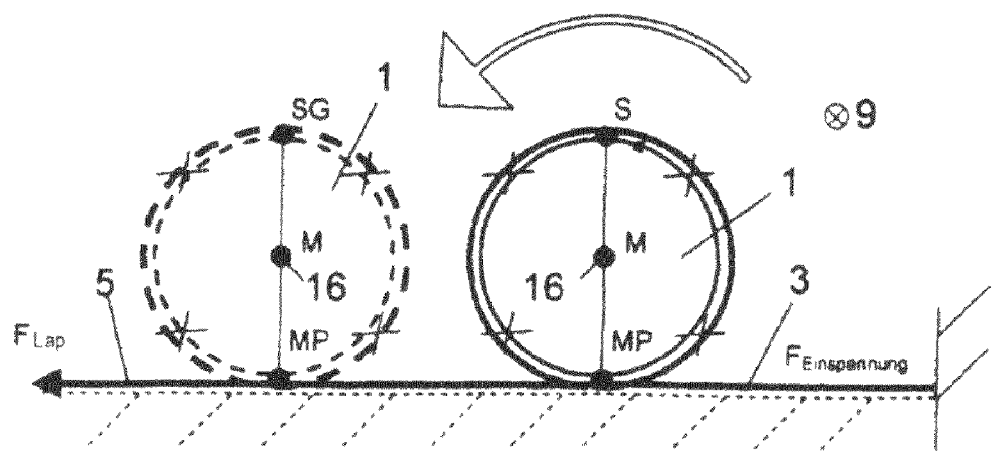
FIG. 2: shows a further schematic sectional view of the deflecting body shown in FIG. 1, with additional clamping of the deflecting body in the form of a connection of the deflecting body to a vehicle chassis.
Figure 3:
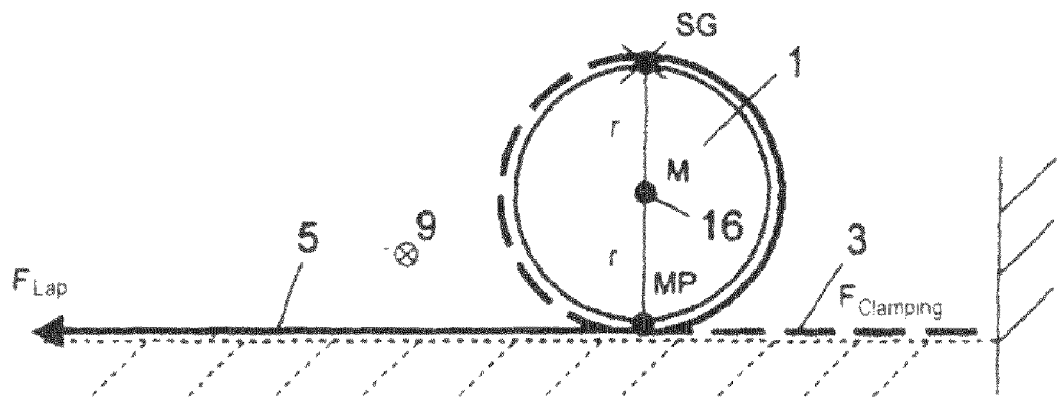
FIG. 3: shows a further schematic sectional view of the deflecting body shown in FIG. 1, with additional clamping of the deflecting body in the form of a connection of the deflecting body to a vehicle chassis.
Figure 4:
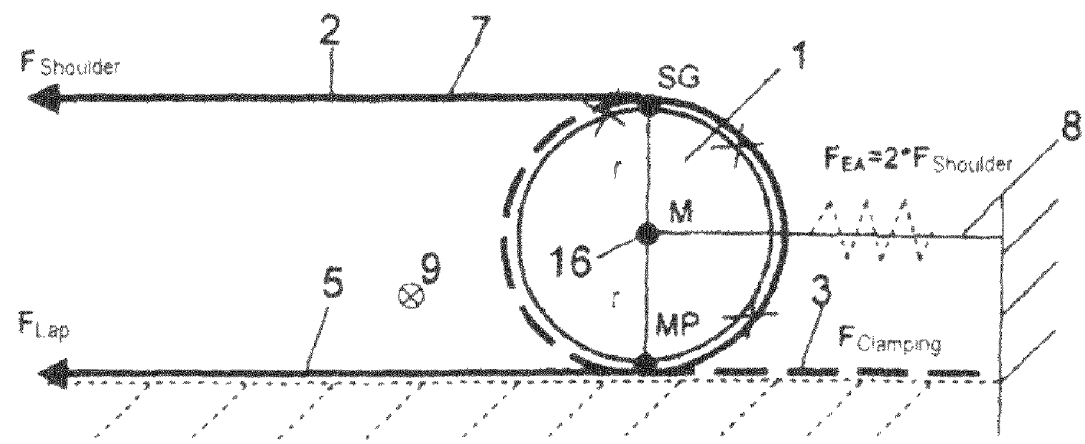
FIG. 4: shows a further schematic sectional view of the deflecting body shown in FIGS. 1 and/or 3, with an additional connection between the deflection roller and the vehicle chassis via an elastically deformable deformation element (spring)

However, an unrolling plane is not produced here but the technical principles of cable theory are utilized, in particular simply wrapping a cable 2 around a roller, as is to be shown with reference to FIGS. 2 and 3.

According to FIGS. 2 and 3, the cable 2 (and/or the safety belt 2) is completely wrapped around the deflection roller 1 and is clamped at one end. A force $F_{Lap}$ also acts at the other end. Irrespective of the size of this force, no movement of the deflection roller 1 is induced. This force only acts on the compression between the deflection roller 1 and the cable 2 along the wrapped-around portion and is entirely diverted by the clamping. Thus the following force ratio results:

$$F_{Lap} = F_{Clamping}$$

Thus the system is in a semi-stable state. The reason for this is the fact that the deflection roller 1 may adopt any position along the unrolling plane without altering the force flux. The system is itself under tension and yet movable. If the cable 2 which is wrapped around is cut off along the wrapped-around portion and the new cable ends fixedly connected to the deflection roller 1, the system has the same properties as with a complete cable 2.

Proceeding from these observations, it is possible to expand and modify the system further. To this end, according to FIG. 4 a further force $F_{Shoulder}$ is introduced at the upper point SG, as is also a deflection of this force via the point M by an energy absorption element (deformation element 8). The fully wrapped-around portion is disconnected and simulated by a non-positive or positive connection of the cable 2 to the deflection roller 1. As a result, it is again ensured that the relative movement between the deflection roller 1 and the safety belt 2 (cable 2) is prevented. The system is thus as follows:

With all possible types of force distribution, an equilibrium results. The sum of the horizontal forces is thus equal to zero:

$$F_{Shoulder} + F_{Lap} - F_{EA} - F_{Clamping} = 0$$

The instantaneous equilibrium about the point MP results in:

$$F_{shoulder} * 2 * r = F_{EA} * r$$

$$F_{Shoulder} * 2 = F_{EA}$$

Thus resulting in:

$$F_{Clamping} = F_{Lap} - F_{Shoulder}$$

i.e. a defined force flux which is independent of the position of the deflection roller 1. When installing an energy absorption element (deformation element 8), for example at the point M, which is fixedly connected to the clamped portion, a restriction of the force $F_{Shoulder}$ is possible. Provided the force $2*F_{Shoulder}$ does not exceed the deformation force $F_{EA}$, an equilibrium of the system is set and all the forces flow into the clamped portion. When exceeding the preset deformation force $F_{EA}$, for example 6 kN, a force of $F_{shoulder} = 3$ kN is present at the point SG and the deflection roller 1 is set in motion. As the force flux between $F_{Lap}$ and $F_{Clamping}$ as already disclosed remains in existence, the lap portion force may be entirely deflected, movement of the lap portion prevented and the shoulder belt force limited by the preset force $F_{EA}$.

In order to establish the defined motion of the deflection roller 1, preferably according to FIG. 5, elongate elements 3 in the form of flat strips, preferably made of sheet metal, are used. These sheet metal elements are connected in a suitable manner to the locking tongue 4 and run along the peripheral surface of the deflection roller 1, respectively to the left and right in the vicinity of the deflected safety belt 2. At the ends, they create a fixed connection with the deflection roller 1. In this manner, it is possible to establish a defined unrolling path, which is not exceeded after the unrolling process. In this case, the unrolled elongate elements 3 serve as connecting webs between the deflection roller 1 and the locking tongue 4. The energy absorption takes place possibly and additionally by the expansion of deformation elements 8. Other energy absorption principles which may be implemented are the withdrawal of pins, deflection and bending deformation of elements, pure tensile force as well as the shearing-off of links (see above).

With the deflection roller 1 according to FIG. 6, which is connected by means of a pin 8 to the locking tongue 4, an unrolling movement of the deflection roller 1 in the direction of the shoulder belt force by the amount x causes a withdrawal of the pin 8 by the same amount x, as both relate to the point M.

If, however, the pin 8 is attached at a different point, for example at the point SG (dotted line) then the point SG shifts by the amount 2*x during an unrolling movement of the deflection roller 1 by x. These geometric features are transferred to the necessary limiting forces which the pin 8 has to implement. The first case is a dual shoulder belt force, the second case is a single shoulder belt force but with a dual path. In terms of energy, both cases produce the same implemented deformation energy.

The invention claimed is:

1. A buckle device for a motor vehicle, comprising:
    a locking tongue for inserting into a buckle; and
    a deflecting body connected to the locking tongue, which is configured to subdivide a safety belt into a shoulder portion and a lap portion and to deflect said safety belt such that the shoulder and lap portions extend away from the deflecting body in different directions,
    wherein the deflecting body is connected to the locking tongue via at least one elongate element, which is at least partially wound around the deflecting body, and
    wherein the at least one elongate element is unwound from the deflecting body by a force acting on the shoulder portion which exceeds a predetermined threshold force, in order to limit a resulting force acting on the shoulder portion.

2. The buckle device as claimed in claim 1, wherein the deflecting body extends in a direction of extension.

3. The buckle device as claimed in claim 2, wherein the at least one elongate element extends in a direction transverse to the direction of extension of the deflecting body, and is wound around the deflecting body.

4. The buckle device as claimed in claim 2, wherein the at least one elongate element extends in a direction transverse to the direction of extension of the deflecting body, and is wound around an end portion of the deflecting body.

5. The buckle device as claimed in claim 4, wherein the end portion is connected via a central portion of the deflecting body to a further end portion of the deflecting body.

6. The buckle device as claimed in claim 5, wherein a center of gravity axis of the central portion extending parallel to the direction of extension does not coincide with a common cylinder axis of the end portion and the further end portion.

7. The buckle device as claimed in claim 1, wherein the deflecting body is connected to the locking tongue via at least one deformation element which, when the at least one elongate element is unwound, is deformed by absorption of energy.

8. The buckle device as claimed in claim 1, wherein the at least one elongate element comprises first and second elongate elements, wherein the deflecting body is connected to the locking tongue via the first and second elongate elements, which are wound at least partially around the deflecting body, and wherein the first and second elongate elements are unwound from the deflecting body by the force acting on the shoulder portion that exceeds said threshold force, in order to limit the resulting force acting on the shoulder portion.

9. The buckle device as claimed in claim 8, wherein the first elongate element is wound around a first end portion of the deflecting body, and wherein the second elongate element is wound around a second end portion of the deflecting body.

10. The buckle device as claimed in claim 1, wherein for bearing the safety belt against the deflecting body, the deflecting body has a bearing region, the safety belt being positioned around the bearing region.

11. The buckle device as claimed in claim 1 wherein the at least one elongate element is connected to the locking tongue via a weak point, which tears when the at least one elongate element is unwound.

12. A buckle device for a motor vehicle, comprising:
a locking tongue for inserting into a buckle; and
a deflecting body connected to the locking tongue, which is configured to subdivide a safety belt into a shoulder portion and a lap portion and to deflect said safety belt such that the shoulder and lap portions extend away from the deflecting body in different directions,
wherein the deflecting body is connected to the locking tongue via at least one elongate element, which is at least partially wound around the deflecting body,
wherein for bearing the safety belt against the deflecting body, the deflecting body has a bearing region, the safety belt being positioned around the bearing region, and
wherein the bearing region is configured to cooperate with the safety belt such that with a force acting on the shoulder portion which exceeds a predetermined threshold force, the safety belt bearing against the bearing region drives the deflecting body to a rotational movement, so that the at least one elongate element is unwound from the deflecting body.

13. The buckle device as claimed in claim 12, wherein the bearing region is configured to cooperate with the safety belt such that the deflecting body, with the force acting on the shoulder portion that exceeds the threshold force, is carried along by the safety belt by an increased friction between the bearing region and the safety belt, and
wherein a friction between the bearing region and the safety belt, with a force acting on the shoulder portion which is lower than said threshold force, allows the safety belt to slide along the deflecting body without said deflecting body being carried along by the safety belt.

14. A buckle device for a motor vehicle, comprising:
a locking tongue for inserting into a buckle; and
a deflecting body connected to the locking tongue, which is configured to subdivide a safety belt into a shoulder portion and a lap portion and to deflect said safety belt such that the shoulder and lap portions extend away from the deflecting body in different directions,
wherein the deflecting body is connected to the locking tongue via at least one elongate element, which is at least partially wound around the deflecting body,
wherein for bearing the safety belt against the deflecting body, the deflecting body has a bearing region, the safety belt being positioned around the bearing region, and
wherein the bearing region has a first bearing surface and a second bearing surface.

15. The buckle device as claimed in claim 14, wherein the safety belt with a force acting on the shoulder portion which is lower than a predetermined threshold force only bears against the first bearing surface, and wherein the safety belt with a force acting on the shoulder portion which exceeds said threshold force bears against the second bearing surface.

16. The buckle device as claimed in claim 15, wherein a friction prevails between the second bearing surface and the safety belt, which causes the deflecting body to be carried along by the safety belt, when the safety belt bears against the second bearing surface, and
wherein, a friction prevails between the first bearing surface and the safety belt, which allows the safety belt to slide along the deflecting body without the deflecting body being carried along by the safety belt, when the safety belt only bears against the first bearing surface.

17. The buckle device as claimed in claim 14, wherein the first bearing surface is formed by a surface facing the safety belt of at least one movable element mounted on the deflecting body, and wherein the second bearing surface is formed by a surface of a central portion of the deflecting body facing the safety belt.

18. The buckle device as claimed in claim 14, wherein the first bearing surface projects beyond the second bearing surface, along a normal of the second bearing surface, so that the safety belt with a force acting on the shoulder portion which is lower than a predetermined threshold force only bears against the first bearing surface, and the safety belt with a force acting on the shoulder portion which exceeds said threshold force is deformed such that the safety belt bears against the second bearing surface.

19. The buckle device as claimed in claim 18, wherein at least one projection projecting from the deflecting body with a surface remote from the deflecting body forms the first bearing surface.

* * * * *